(12) United States Patent
Umeda et al.

(10) Patent No.: US 8,450,899 B2
(45) Date of Patent: May 28, 2013

(54) STATOR FOR ELECTRIC ROTATING MACHINE

(75) Inventors: Atsushi Umeda, Okazaki (JP); Atsuo Ishizuka, Nagoya (JP); Shigenobu Nakamura, Anjo (JP)

(73) Assignee: Denso Corporation, Kariya (JP)

(*) Notice: Subject to any disclaimer, the term of this patent is extended or adjusted under 35 U.S.C. 154(b) by 258 days.

(21) Appl. No.: 12/837,726

(22) Filed: Jul. 16, 2010

(65) Prior Publication Data

US 2011/0012450 A1     Jan. 20, 2011

(30) Foreign Application Priority Data

Jul. 17, 2009 (JP) ................................ 2009-169520
Oct. 20, 2009 (JP) ................................ 2009-241798
Jun. 15, 2010 (JP) ................................ 2010-135853

(51) Int. Cl.
*H02K 11/00* (2006.01)
*H02K 3/28* (2006.01)

(52) U.S. Cl.
USPC .............. 310/195; 310/71; 310/179; 310/207

(58) Field of Classification Search
USPC .................... 310/71, 195, 207, 179
IPC .............................. H02K 3/28,11/00
See application file for complete search history.

(56) References Cited

U.S. PATENT DOCUMENTS

| | | | | |
|---|---|---|---|---|
| 3,969,658 A | * | 7/1976 | Htsui | ............................ 318/740 |
| 4,115,915 A | * | 9/1978 | Godfrey | .......................... 29/596 |
| 4,270,065 A | * | 5/1981 | Major | ........................... 310/207 |
| 8,008,830 B2 | | 8/2011 | Kouda et al. | |
| 2002/0036439 A1 | * | 3/2002 | Ooiwa | ........................ 310/207 |
| 2002/0047475 A1 | | 4/2002 | Kusumoto et al. | |
| 2003/0214190 A1 | | 11/2003 | Congdon et al. | |
| 2005/0212372 A1 | * | 9/2005 | Akita et al. | ................... 310/180 |

(Continued)

FOREIGN PATENT DOCUMENTS

| | | |
|---|---|---|
| CN | 101379678 | 3/2009 |
| JP | 2001-145286 | 5/2001 |
| JP | 2007-288848 | 1/2007 |
| JP | P2009-112186 A | 5/2009 |

OTHER PUBLICATIONS

Chinese Office Action dated May 4, 2012, issued in corresponding Chinese Application No. 201010272517.8 with English translation.

(Continued)

*Primary Examiner* — John K Kim
(74) *Attorney, Agent, or Firm* — Nixon & Vanderhye, P.C.

(57) ABSTRACT

A stator includes a stator core and a multi-phase stator coil comprised of a plurality of electric wires. Each of the electric wires has first, second, . . . , nth in-slot portions and first, second, . . . , (n−1)th turn portions, where n is an integer not less than 4. The first in-slot portions of the electric wires are located most radially outward and the nth in-slot portions are located most radially inward in the slots of the stator core. Each of the electric wires also has a first end portion positioned on the first in-slot portion side and a second end portion positioned on the nth in-slot portion side. Each of phase windings of the stator coil is formed of at least two of the electric wires. The first end portion of one of the two electric wires is connected to the second end portion of the other electric wire.

18 Claims, 30 Drawing Sheets

U.S. PATENT DOCUMENTS

| | | | |
|---|---|---|---|
| 2006/0032040 A1* | 2/2006 | Neet | 29/596 |
| 2006/0152188 A1* | 7/2006 | Yasuhara et al. | 318/727 |
| 2007/0013261 A1* | 1/2007 | Shichijo et al. | 310/263 |
| 2007/0182267 A1* | 8/2007 | Neet | 310/180 |
| 2009/0085421 A1* | 4/2009 | Saito et al. | 310/214 |
| 2009/0140594 A1* | 6/2009 | Ogawa et al. | 310/195 |
| 2009/0200888 A1* | 8/2009 | Tanaka et al. | 310/195 |
| 2010/0141078 A1 | 6/2010 | Kouda et al. | |
| 2011/0012450 A1* | 1/2011 | Umeda et al. | 310/71 |
| 2012/0007462 A1 | 1/2012 | Kouda et al. | |

OTHER PUBLICATIONS

English Language Translation of Chinese Office Action issued in CN 201010272517.8 on Dec. 24, 2012.

* cited by examiner

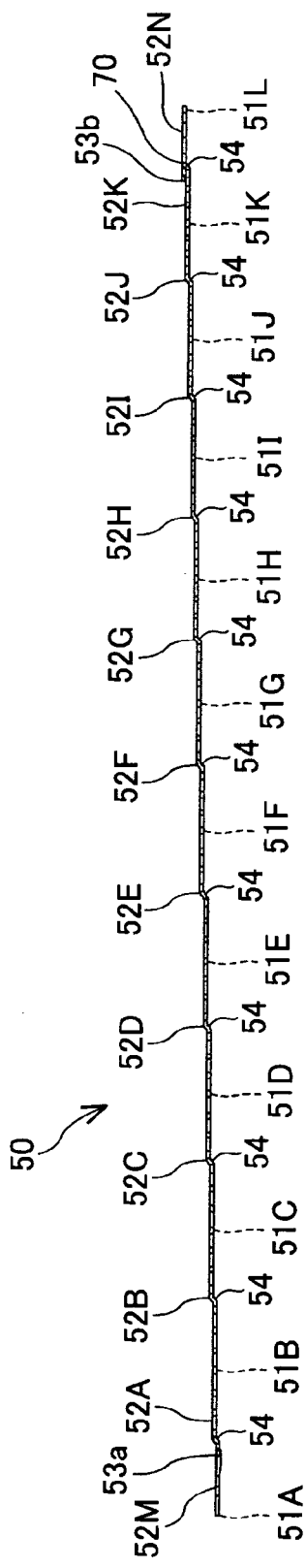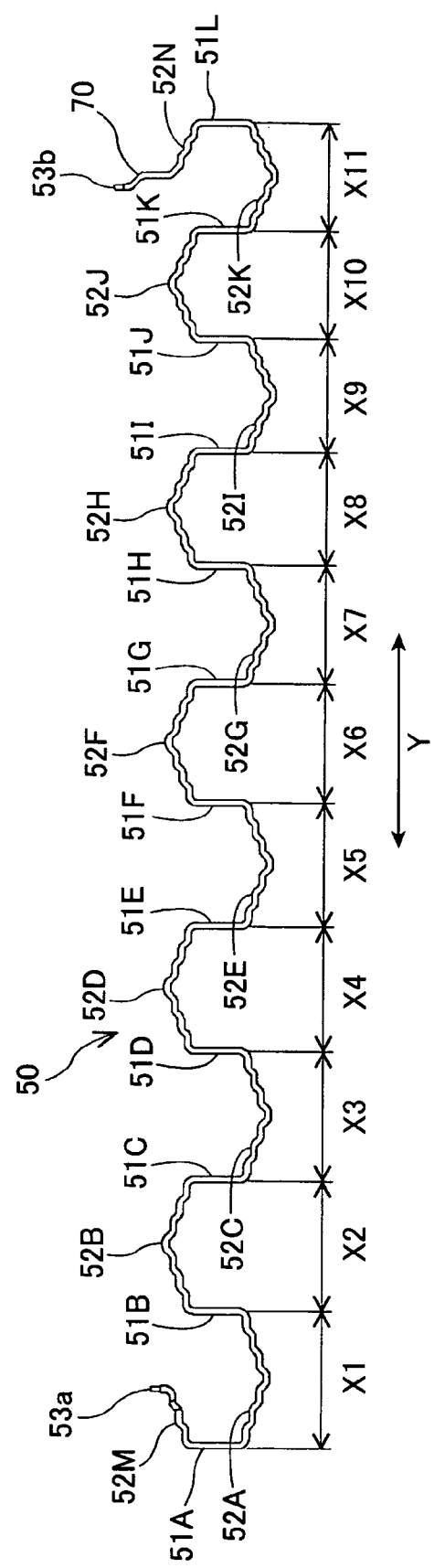
FIG.11A
FIG.11B

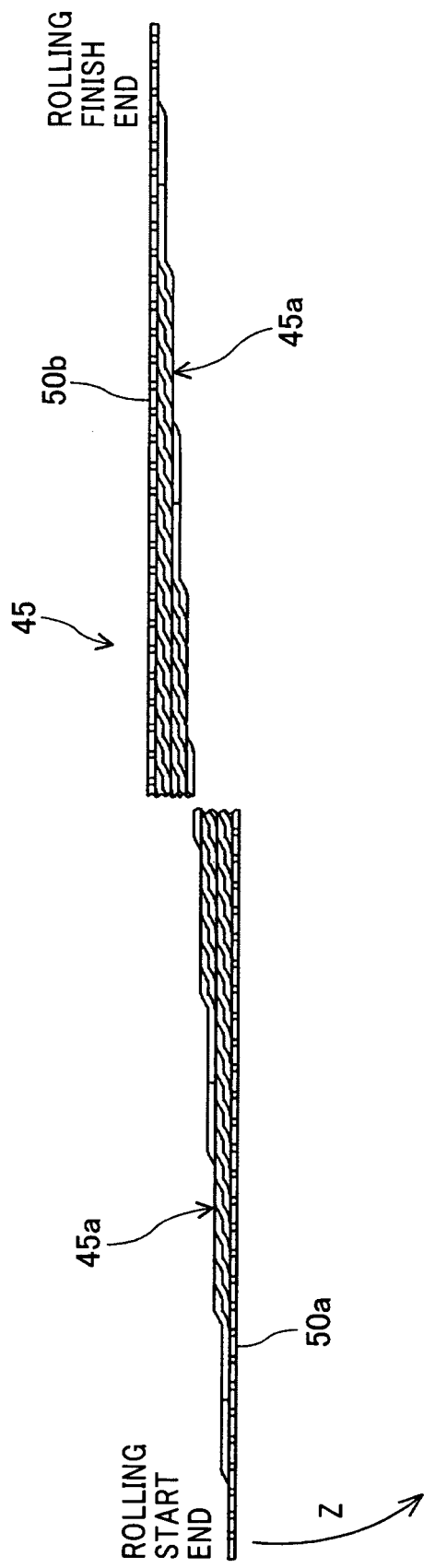

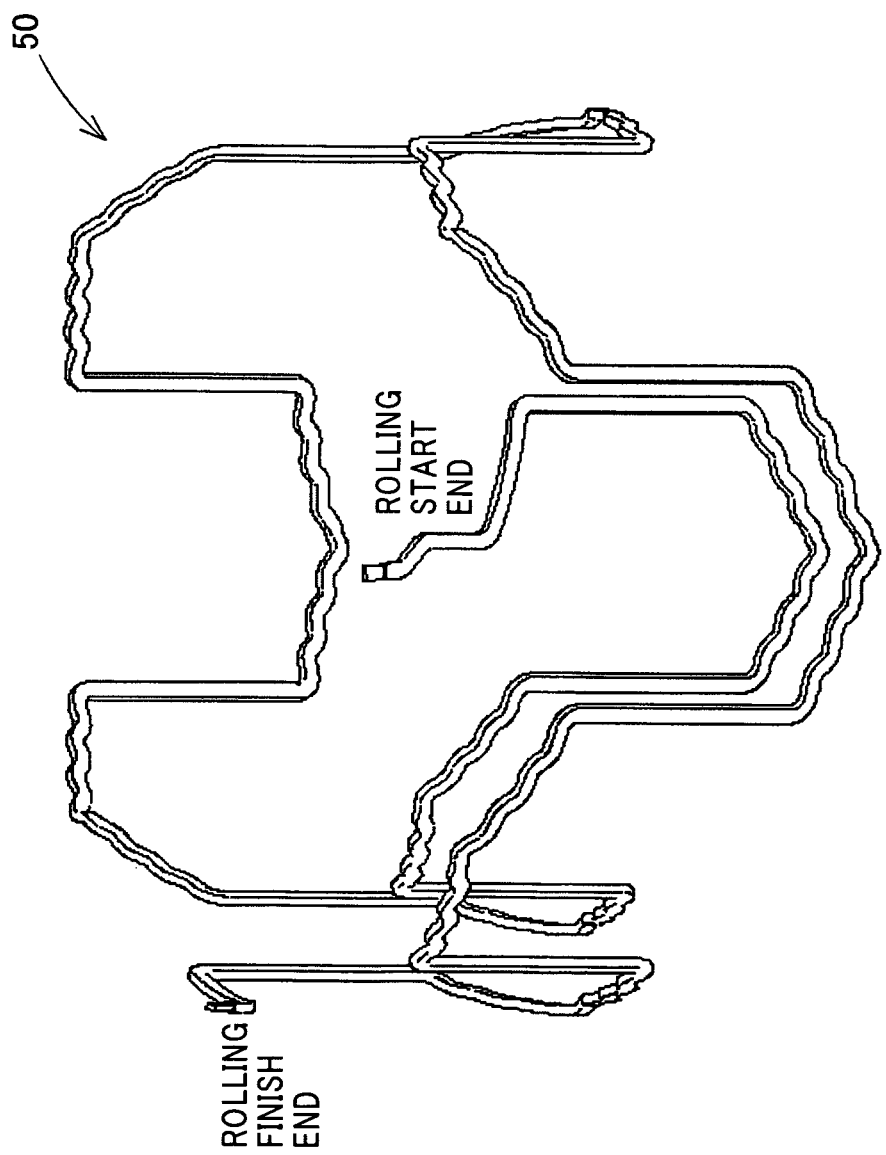

FIG.17

| SLOT NUMBER | OUTERMOST LAYER | INNERMOST LAYER |
|---|---|---|
| 1 | U1-1 | U1-3' |
| 2 | U2-1 | U2-3' |
| 3 | W1-1' | W1-3 |
| 4 | W2-1' | W2-3 |
| 5 | V1-1 | V1-3' |
| 6 | V2-1 | V2-3' |
| 7 | U1-1' | U1-4 |
| 8 | U2-1' | U2-4 |
| 9 | W1-1 | W1-4' |
| 10 | W2-1 | W2-4' |
| 11 | V1-1' | V1-4 |
| 12 | V2-1' | V2-4 |
| 13 | U1-2 | U1-4' |
| 14 | U2-2 | U2-4' |
| 15 | W1-2' | W1-4 |
| 16 | W2-2' | W2-4 |
| 17 | V1-2 | V1-4' |
| 18 | V2-2 | V2-4' |
| 19 | U1-2' | U1-1 |
| 20 | U2-2' | U2-1 |
| 21 | W1-2 | W1-1' |
| 22 | W2-2 | W2-1' |
| 23 | V1-2' | V1-1 |
| 24 | V2-2' | V2-1 |

| SLOT NUMBER | OUTERMOST LAYER | INNERMOST LAYER |
|---|---|---|
| 25 | U1-3 | U1-1' |
| 26 | U2-3 | U2-1' |
| 27 | W1-3' | W1-1 |
| 28 | W2-3' | W2-1 |
| 29 | V1-3 | V1-1' |
| 30 | V2-3 | V2-1' |
| 31 | U1-3' | U1-2 |
| 32 | U2-3' | U2-2 |
| 33 | W1-3 | W1-2' |
| 34 | W2-3 | W2-2' |
| 35 | V1-3' | V1-2 |
| 36 | V2-3' | V2-2 |
| 37 | U1-4 | U1-2' |
| 38 | U2-4 | U2-2' |
| 39 | W1-4' | W1-2 |
| 40 | W2-4' | W2-2 |
| 41 | V1-4 | V1-2' |
| 42 | V2-4 | V2-2' |
| 43 | U1-4' | U1-3 |
| 44 | U2-4' | U2-3 |
| 45 | W1-4 | W1-3' |
| 46 | W2-4 | W2-3' |
| 47 | V1-4' | V1-3 |
| 48 | V2-4' | V2-3 |

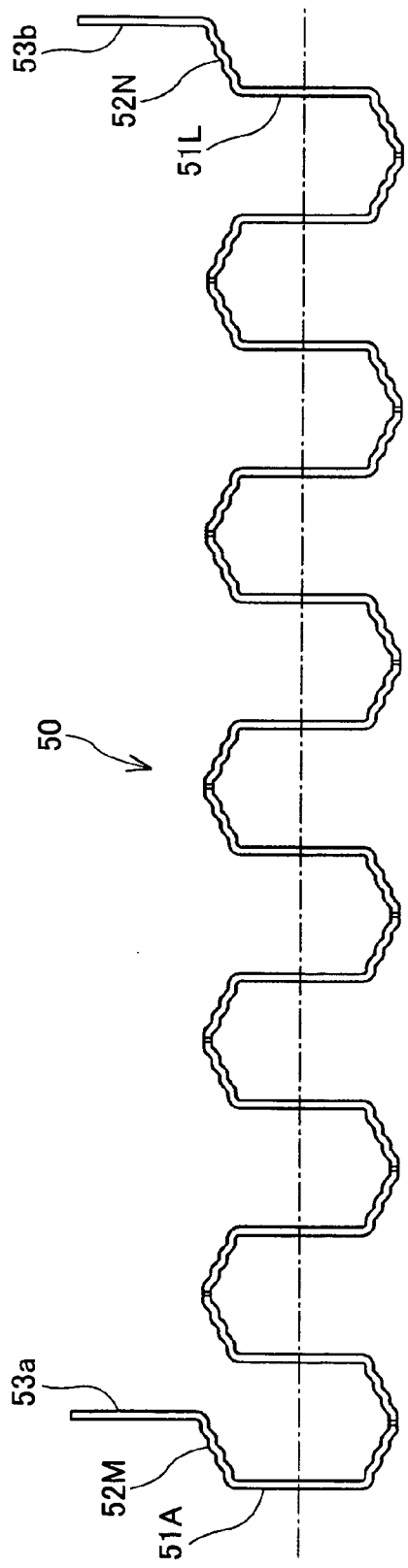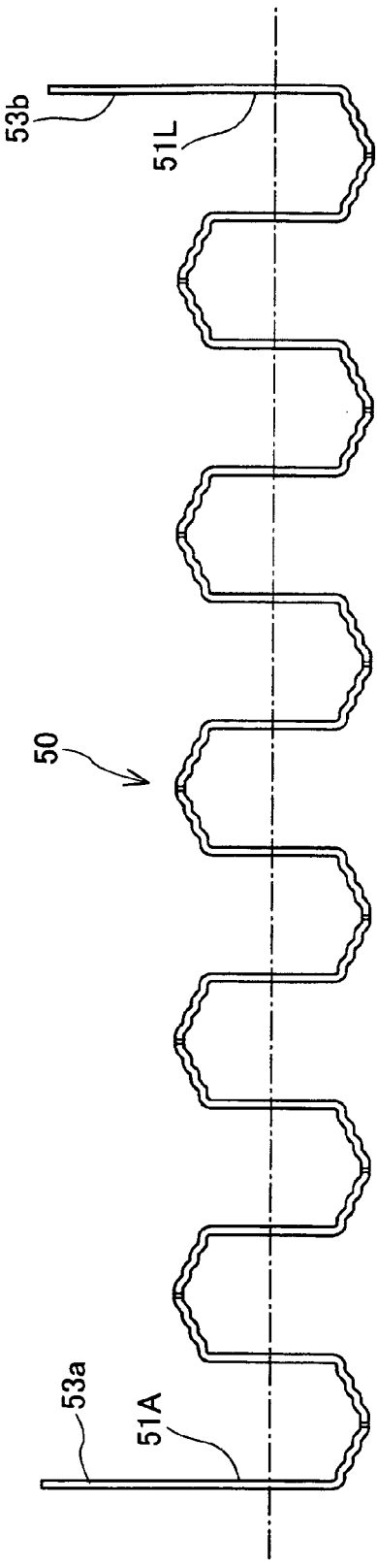

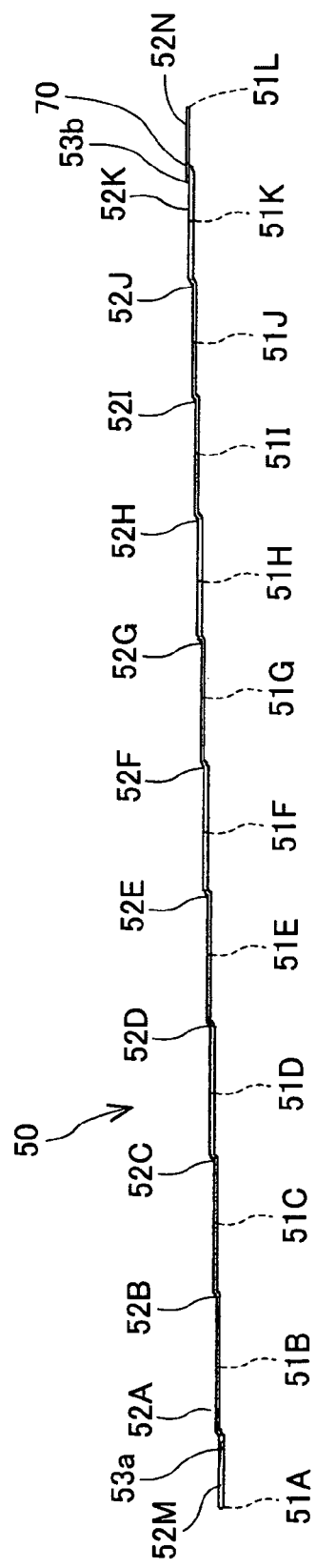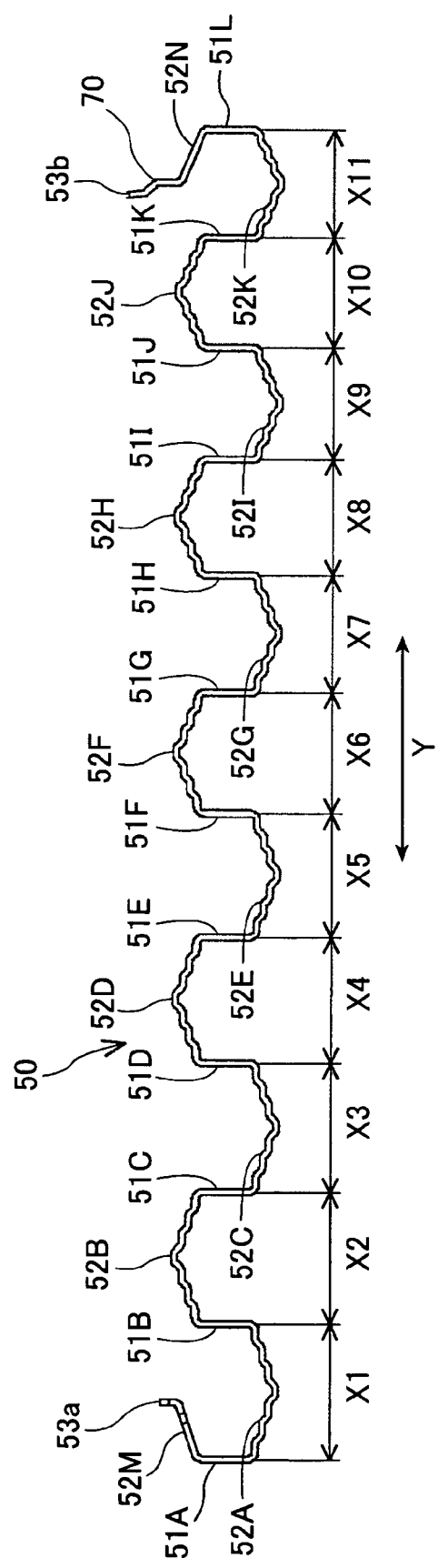

STATOR FOR ELECTRIC ROTATING MACHINE

CROSS-REFERENCE TO RELATED APPLICATIONS

This application is based on and claims priority from Japanese Patent Applications No. 2009-169520 filed on Jul. 17, 2009, No. 2009-241798 filed on Oct. 20, 2009, and No. 2010-135853 filed on Jun. 15, 2010, the contents of which are hereby incorporated by reference in their entireties into this application.

BACKGROUND OF THE INVENTION

1. Technical Field of the Invention

The present invention relates to stators for electric rotating machines that are used in, for example, motor vehicles as electric motors and electric generators.

2. Description of the Related Art

Conventionally, there are known stators for electric rotating machines which include a hollow cylindrical stator core and a stator coil. The stator core has a plurality of slots that are formed in the radially inner surface of the stator core and spaced in the circumferential direction of the stator core. The stator coil is comprised of a plurality of electric wires mounted on the stator core.

Moreover, there is disclosed, for example in Japanese Unexamined Patent Application Publication No. 2001-145286, a method of manufacturing a stator. According to the method, to improve the space factors of the electric wires in the slots of the stator core, each of U-phase, V-phase, and W-phase windings of the stator coil is configured to have a rectangular cross section and have such an overall shape that when developed on a plane, the winding meanders in the form of cranks. Further, each of the U-phase, V-phase, and W-phase windings is wound by a predetermined number of turns into a spiral shape, so as to make the stator coil have a hollow cylindrical shape.

With the above method, however, each of the electric wires (or electric conductors) that respectively make up the U-phase, V-phase, and W-phase windings of the stator coil is required to have a long length. Accordingly, a large-scale shaping machine is needed for shaping the electric wires. Moreover, since each of the electric wires is long, it is difficult to handle the electric wires during the manufacture of the stator. As a result, it is difficult to secure a high productivity and a low cost of the stator. Furthermore, since the electric wires are wound into the spiral shape and received in the slots of the stator core, interference may occur, due to the springback of the electric wires, between the stator coil and a rotor disposed radially inside of the stator. Consequently, the stator coil may be damaged due to this interference, thereby lowering the reliability of the stator.

SUMMARY OF THE INVENTION

The present invention has been made in view of the above-mentioned problems with the prior art.

According to the present invention, there is provided a stator for an electric rotating machine which includes a hollow cylindrical stator core and a stator coil. The stator core has a plurality of slots that are formed in a radially inner surface of the stator core and spaced in a circumferential direction of the stator core. The stator coil is comprised of a plurality of electric wires mounted on the stator core. Each of the electric wires has first, second, . . . , nth in-slot portions and first, second, . . . , (n−1)th turn portions, where n is an integer not less than 4. The first to the nth in-slot portions are sequentially received in p of the slots of the stator core, where p is an integer not greater than n. The first to the (n−1)th turn portions are alternately located on opposite axial sides of the stator core outside of the slots to connect corresponding adjacent pairs of the first to the nth in-slot portions. Each of the electric wires also has first and second end portions. The first end portion is closer to the first in-slot portion than any other of the in-slot portions of the electric wire; the second end portion is closer to the nth in-slot portion than any other of the in-slot portions of the electric wire. The first in-slot portions of the electric wires are located most radially outward and the nth in-slot portions are located most radially inward in the slots of the stator core. The stator coil is a multi-phase stator coil which is comprised of a plurality of phase windings. Each of the phase windings of the stator coil is formed of at least two of the electric wires. The first end portion of one of the two electric wires is connected to the second end portion of the other electric wire.

With the above configuration, since each of the phase windings of the stator coil is formed of the at least two electric wires, it is possible to shorten the length of each of the electric wires. Consequently, the electric wires can be shaped using a small-scale shaping machine and be easily handled during the manufacture of the stator. As a result, it is possible to achieve a high productivity and a low cost of the stator. Furthermore, since the first in-slot portions of the electric wires are located most radially outward and the nth in-slot portions are located most radially inward in the slots of the stator core, the first and second end portions of each of the electric wires can be respectively drawn from the radially inner and radially outer peripheries of the stator core. Consequently, each corresponding pair of the first and second end portions of the electric wires can be respectively drawn from two sufficiently-distant places. As a result, flexibility is improved in the connecting of the electric wires.

BRIEF DESCRIPTION OF THE DRAWINGS

The present invention will be understood more fully from the detailed description given hereinafter and from the accompanying drawings of preferred embodiments of the invention, which, however, should not be taken to limit the invention to the specific embodiments but are for the purpose of explanation and understanding only.

In the accompanying drawings:

FIG. 11A is a top view of one of the electric wires;

FIG. 11B is a front view of the one of the electric wires;

FIG. 13A is a bottom view of an electric wire assembly comprised of the electric wires for forming the stator coil;

FIG. 13C is a perspective view illustrating one of the electric wires in the electric wire assembly after the electric wire assembly is rolled into a hollow cylindrical shape;

FIG. 17 is a tabular representation showing both the number of the electric wire located at the radially outermost layer and the number of the electric wire located at the radially innermost layer in each of the slots of the stator core;

FIG. 20A is a front view of an electric wire for forming the stator coil according to a third modification of the invention;

FIG. 20B is a front view of an electric wire for forming the stator coil according to a fourth modification of the invention;

FIG. 22A is a top view of an electric wire for forming the stator coil according to a sixth modification of the invention;

FIG. 22B is a front view of the electric wire according to the sixth modification;

DESCRIPTION OF PREFERRED EMBODIMENTS

Figure 1:
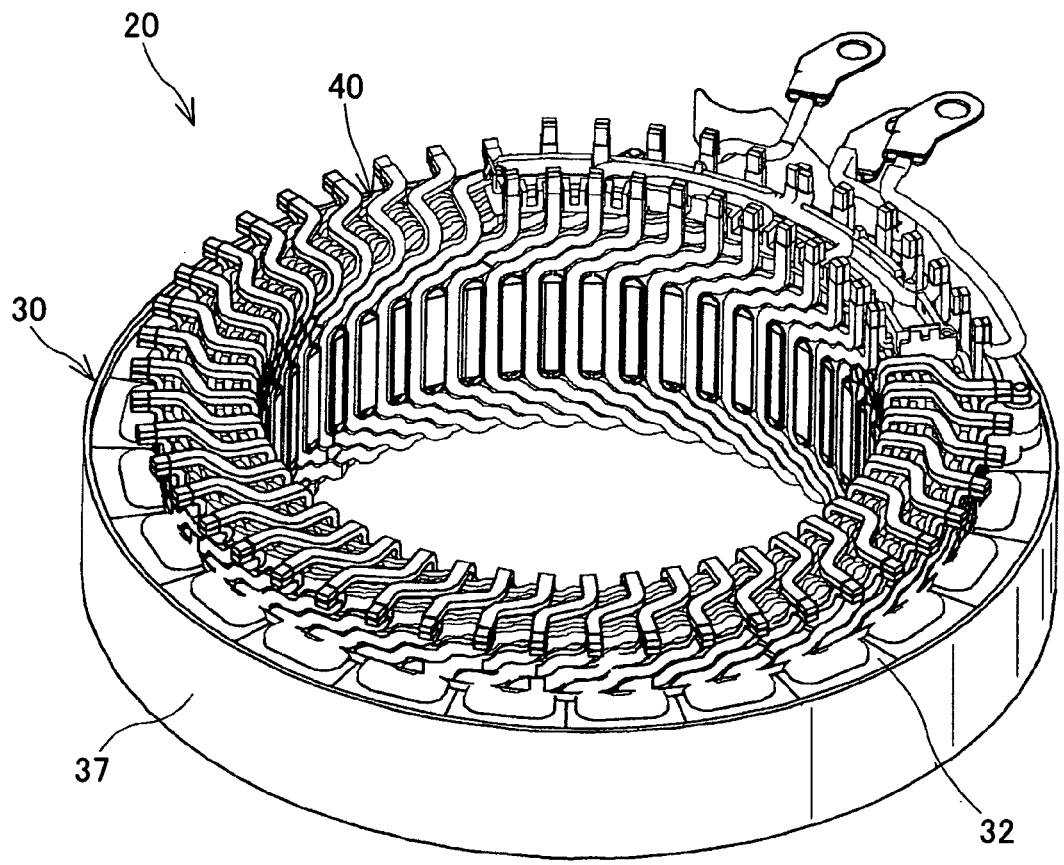
FIG. 1 is a perspective view showing the overall configuration of a stator for an electric rotating machine according to the first embodiment of the invention.

Preferred embodiments of the present invention will be described hereinafter with reference to FIGS. 1-31. It should be noted that, for the sake of clarity and understanding, identical components having identical functions in different embodiments of the invention have been marked, where possible, with the same reference numerals in each of the figures.

[First Embodiment]

Figure 2:
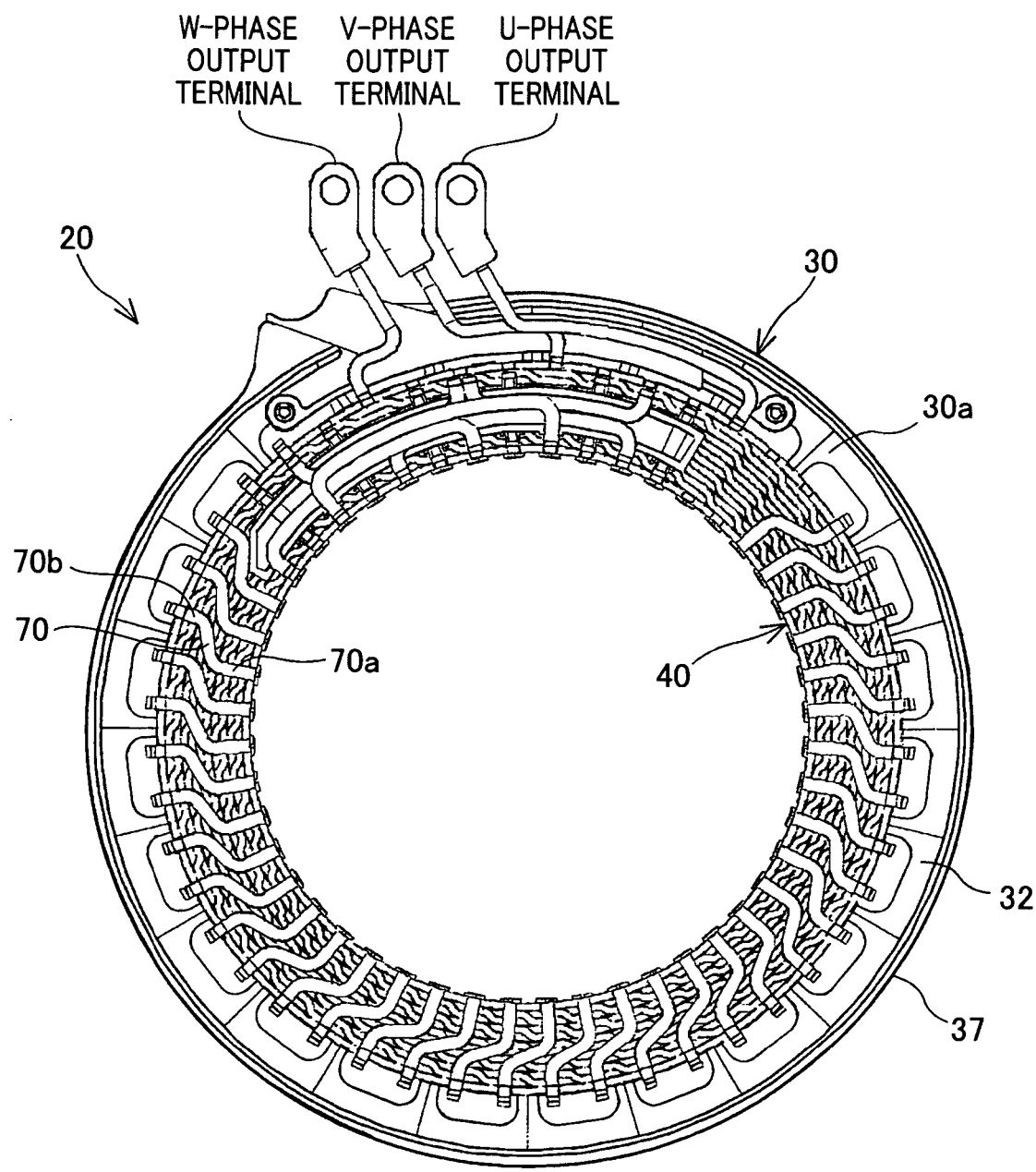
FIG. 2 is a top view of the stator.
Figure 3:
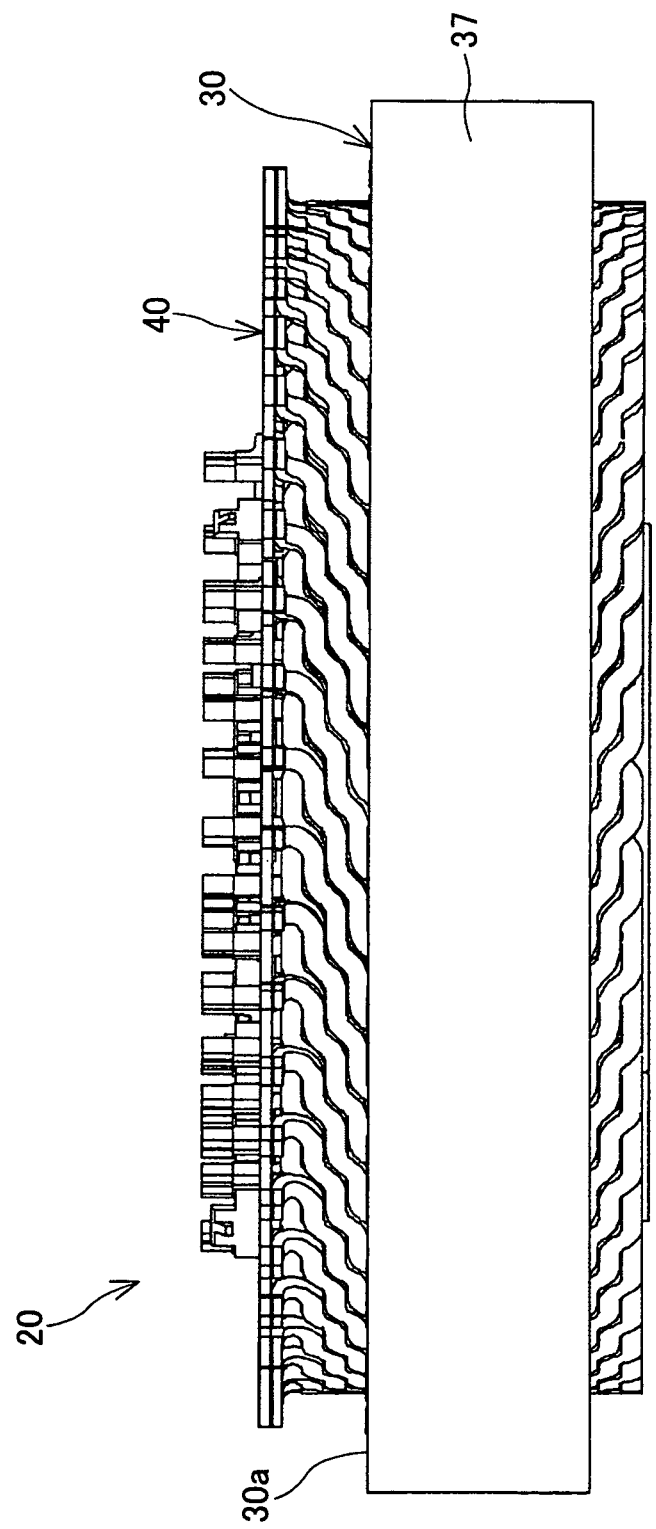
FIG. 3 is a side view of the stator.

FIGS. 1-3 together show the overall configuration of a stator 20 according to a first embodiment of the invention. The stator 20 is designed for use in, for example, an electric rotating machine which is configured to function both as an electric motor and as an electric generator in a motor vehicle. The electric rotating machine further includes a rotor (not shown) that is rotatably disposed so as to be surrounded by the stator 20. The rotor includes a plurality of permanent magnets that form a plurality of magnetic poles on a radially outer periphery of the rotor to face a radially inner periphery of the stator. The polarities of the magnetic poles alternate between north and south in the circumferential direction of the rotor. In addition, in the present embodiment, the number of the magnetic poles formed in the rotor is equal to eight (i.e., four north poles and four south poles).

As shown in FIGS. 1-3, the stator 20 includes a hollow cylindrical stator core 30 and a three-phase stator coil 40 that is comprised of a plurality of (e.g., 48 in the present embodiment) electric wires 50 mounted on the stator core 30. In addition, the stator 20 may further include insulating paper sheets interposed between the stator core 30 and the stator coil 40.

Figure 4:
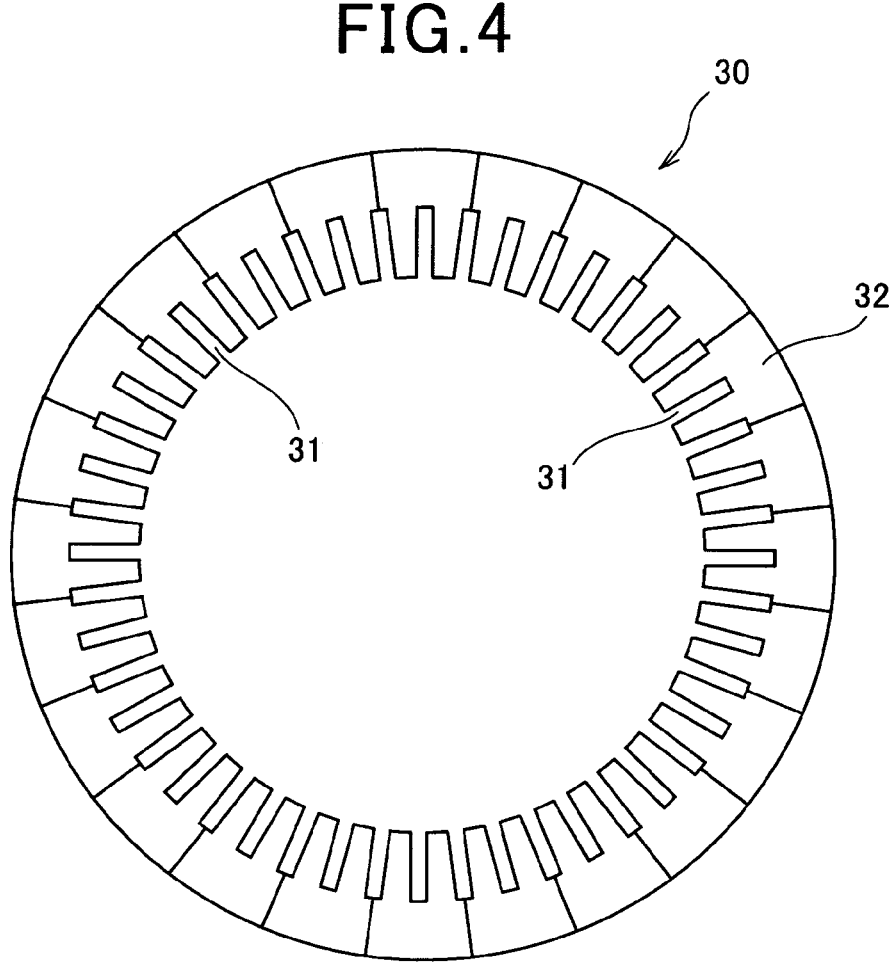
FIG. 4 is a top view of a stator core of the stator.

The stator core 30 has, as shown in FIG. 4, a plurality of slots 31 that are formed in the radially inner surface of the stator core 30 and spaced in the circumferential direction of the stator core 30 at a predetermined pitch. For each of the slots 31, the depth-wise direction of the slot 31 is coincident with a radial direction of the stator core 30. In the present embodiment, there are provided two slots 31 per magnetic pole of the rotor that has the eight magnetic poles and per phase of the three-phase stator coil 40. Accordingly, the total number of the slots 31 provided in the stator core 30 is equal to 48 (i.e., 2×8×3).

Figure 5:
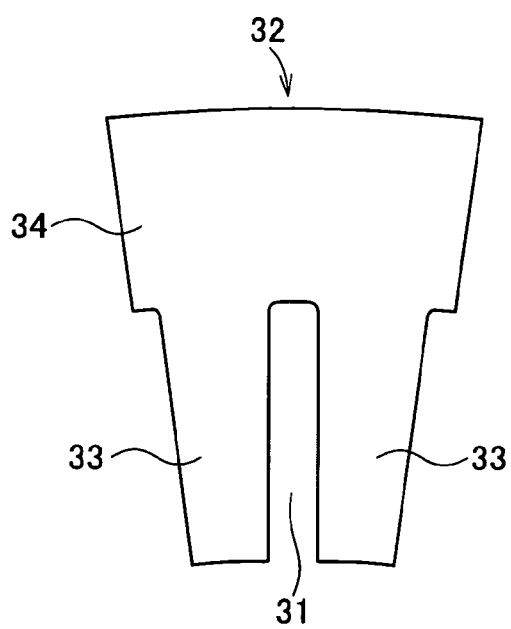
FIG. 5 is a top view of one of stator core segments which together make up the stator core.

Moreover, in the present embodiment, the stator core 30 is made up of, for example, 24 stator core segments 32 as shown in FIG. 5. The stator core segments 32 are joined together so as to adjoin one another in the circumferential direction of the stator core 30. Each of the stator core segments 32 defines therein one of the slots 31. Further, each circumferentially-adjoining pair of the stator core segments 32 together defines a further one of the slots 31 therebetween. Each of the stator core segments 32 also has two tooth portions 33, which radially extend to form the one of the slots 31 therebetween, and a back core portion 34 that is located radially outward of the tooth portions 33 to connect them. In addition, on the radially outer surfaces of the stator core segments 32, there is fitted a cylindrical outer rim 37 (see FIGS. 1-3).

In the present embodiment, each of the stator core segments 32 is formed by laminating a plurality of magnetic steel sheets with a plurality of insulating films interposed therebetween. It should be noted that other conventional metal sheets may also be used instead of the magnetic steel sheets.

Figure 13B:
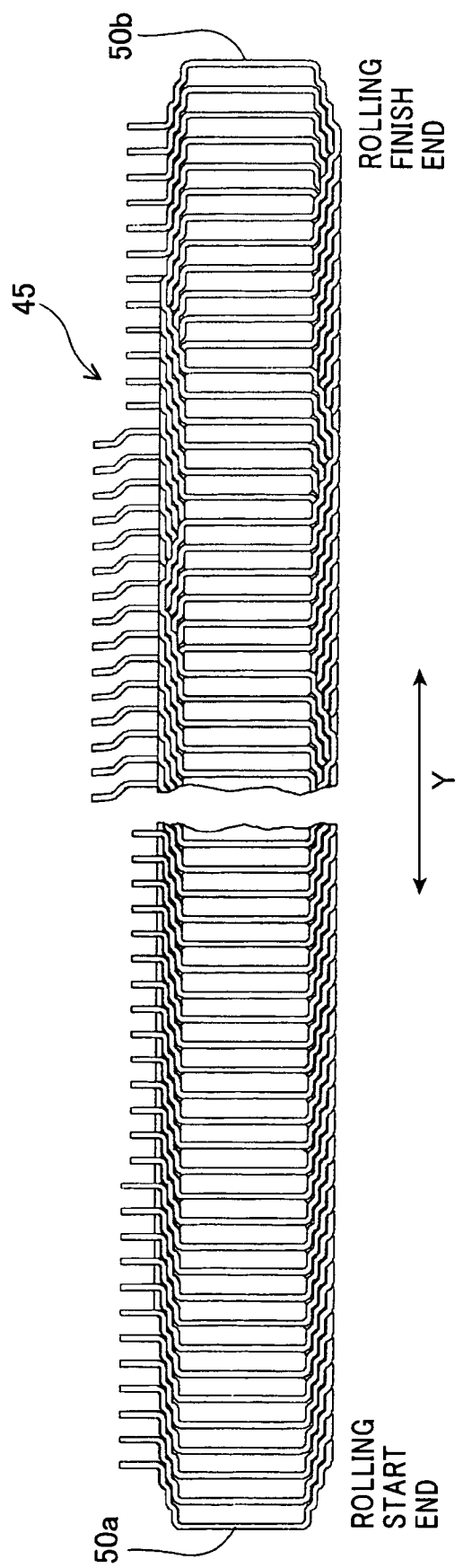
FIG. 13B is a front view of the electric wire assembly.

FIGS. 6-9 together show the configuration of the stator coil 40. In the present embodiment, as to be described later, the stator coil 40 is produced by first stacking the 48 electric wires 50 to form a band-shaped electric wire assembly 45 as shown in FIGS. 13A-13B and then rolling the electric wire assembly 45 into a hollow cylindrical shape.

As shown in FIGS. 6-9, the stator coil 40 has, as a whole, a straight part 41 to be received in the slots 31 of the stator core 30, and a pair of coil end parts 42 that are respectively formed on opposite axial sides of the straight part 41 and to be located outside of the slots 31. Moreover, on one axial side of the straight part 41, U-phase, V-phase, and W-phase output terminals and U-phase, V-phase, and W-phase neutral terminals of the stator coil protrude from the annular axial end face of the coil end part 42, and a plurality of crossover parts 70 of the electric wires 50 cross over the axial end face from the radially inner side to the radially outer side of the axial end face to connect corresponding pairs of the electric wires 50.

Figure 10A:
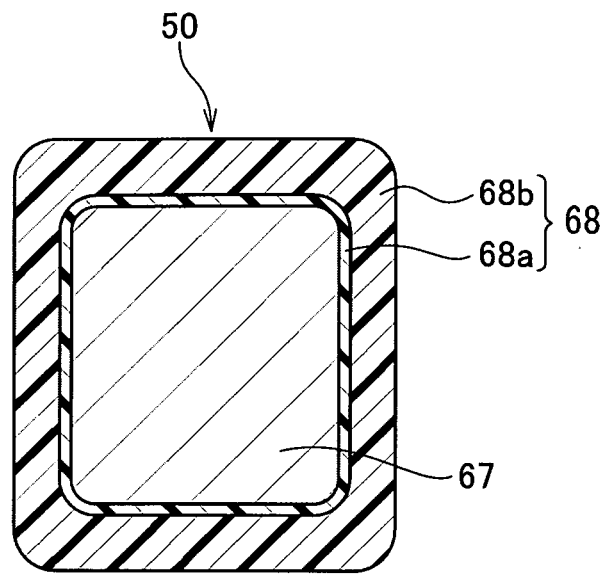
FIG. 10A is a cross-sectional view illustrating the configuration of electric wires forming the stator coil.

Each of the electric wires 50 for forming the stator coil 40 is configured with, as shown in FIG. 10A, an electric conductor 67 and an insulating coat 68 that covers the outer surface of the electric conductor 67. In the present embodiment, the electric conductor 67 is made of copper and has a substantially rectangular cross section. The insulating coat 68 is two-layer structured to include an inner layer 68a and an outer layer 68b. The thickness of the insulating coat 58 (i.e., the sum of thicknesses of the inner and outer layers 68a and 68b) is set to be in the range of 100 to 200 μm.

With such a large thickness of the two-layer structured insulating coat 68, it is possible to reliably insulate the electric wires 50 from one another without interposing insulating paper sheets therebetween. However, it is also possible to interpose insulating paper sheets between the electric wires 50 so as to further enhance the electrical insulation therebetween.

Further, the outer layer 68b is made of an insulating material such as nylon. The inner layer 68a is made of a thermoplastic resin having a higher glass transition temperature than the outer layer 68b or an insulating material having no glass transition temperature such as a polyamide-imide resin. Consequently, the outer layers 68b of the electric wires 50 will be solidified by the heat generated by operation of the electric rotating machine earlier than the inner layers 68a. As a result, the surface hardness of the outer layers 68b will be increased, thereby enhancing the electrical insulation between the electric wires 50.

Figure 10B:
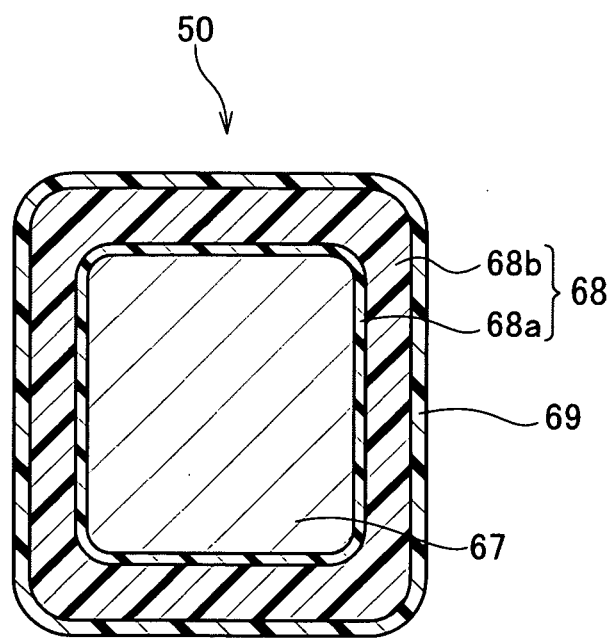
FIG. 10B is a cross-sectional view illustrating a modification of the configuration of the electric wires shown in FIG. 10A.

Furthermore, as shown in FIG. 10B, it is also possible for each of the electric wires 50 to further include a fusible coat 69 to cover the outer surface of the insulating coat 68; the fusible coat 69 may be made, for example, of epoxy resin. In this case, the fusible coats 69 of the electric wires 50 will be fused by the heat generated by operation of the electric rotating machine earlier than the insulating coats 68, thereby bonding together those portions of the electric wires 50 which are received in the same ones of the slots 31 of the stator core 30. As a result, those portions of the electric wires 50 will be integrated into a rigid body, thereby enhancing the mechanical strength thereof. In addition, the outer layers 68b of the insulating coats 68 of the electric wires 50 may also be made of PPS (polyphenylene sulfide).

FIGS. 11A-11B together show the shape of each of the electric wires 50 before the electric wires 50 are stacked to form the band-shaped electric wire assembly 45.

As shown in FIGS. 11A-11B, each of the electric wires 50 is wave-shaped to include a plurality of in-slot portions 51 and a plurality of turn portions 52. The in-slot portions 51 are spaced in the longitudinal direction Y of the electric wire 50 at predetermined pitches and extend perpendicular to the longitudinal direction Y. Each of the in-slot portions 51 is to be received in a corresponding one of the slots 31 of the stator core 30. Each of the turn portions 52 extends to connect a corresponding adjacent pair of the in-slot portions 51 and is to be located outside of the slots 31 of the stator core 30.

Specifically, the plurality of in-slot portions 51 include, at least, a first in-slot portion 51A, a second in-slot portion 51B, and a third in-slot portion 51C. The first, second and third in-slot portions 51A, 51B, and 51C are to be respectively received in three different slots 31 of the stator core 30; the three slots 31 are circumferentially spaced at a pitch of six slots 31. On the other hand, the plurality of turn portions 52 include, at least, a first turn portion 52A and a second turn portion 52B. The first turn portion 52A connects the first and second in-slot portions 51A and 51B and is to be located on one axial side of the stator core 30 outside of the slots 31. The second turn portion 52B connects the second and third in-slot portions 51B and 51C and is to be located on the other axial side of the stator core 30 outside of the slots 31.

More specifically, in the present embodiment, as shown in FIGS. 11A-11B, the plurality of in-slot portions 51 include first to twelfth in-slot portions 51A-51L which are to be sequentially received in eight slots 31 that are circumferentially spaced at a pitch of six slots 31. In other words, the number of the in-slot portions 51 in each of the electric wires 50 is equal to 12. On the other hand, the plurality of turn portions 52 include first to eleventh turn portions 52A-52K which each connect a corresponding adjacent pair of the in-slot portions 51A-51L and are to be alternately located on the opposite axial sides of the stator core 30 outside of the slots 31. In other words, the number of the turn portions 52 in each of the electric wires 50 is equal to 11.

Moreover, the predetermined pitches X between the in-slot portions 51A-51L in the longitudinal direction Y of the electric wire 50 gradually decrease in a direction from the first in-slot portion 51A to the twelfth in-slot portion 51L. That is, X1>X2>X3>X4>X5>X6>X7>X8>X9>X10>X11. In addition, the predetermined pitches X1-X11 are set based on the circumferential distances between the eight slots 31 of the stator core 30 in which the in-slot portions 51A-51L are to be received.

Each of the electric wires 50 further includes a pair of lead portions 53a and 53b that are respectively formed at opposite ends of the electric wire 50 for connecting the electric wire 50 with other electric wires 50. The lead portion 53a is connected to the first in-slot portion 51A via a half-turn portion 52M that extends from the first in-slot portion 51A to return inward (i.e., rightward in FIG. 11B) in the longitudinal direction Y of the electric wire 50. The length of the half-turn portion 52M is substantially half the length of the first turn portion 52A. Consequently, the lead portion 53a is offset inward (i.e., rightward in FIG. 11B) in the longitudinal direction Y from the first in-slot portion 51A by the length of the half-turn portion 52M. On the other hand, the lead portion 53b is connected to the twelfth in-slot portion 51L via a half-turn portion 52N that extends from the twelfth in-slot portion 51L to return inward (i.e., leftward in FIG. 11B) in the longitudinal direction Y of the electric wire 50. The length of the half-turn portion 52N is substantially half the length of the eleventh turn portion 52K. Consequently, the lead portion 53b is offset inward (i.e., leftward in FIG. 11B) in the longitudinal direction Y from the twelfth in-slot portion 51L by the length of the half-turn portion 52N. Further, the lead portion 53b is formed to include therein one of the crossover parts 70 described previously.

Furthermore, as shown in FIG. 11A, each of the turn portions 52 includes, substantially at the center thereof, a crank-shaped part 54 that is bent to offset the turn portion 52 in a direction perpendicular to both the longitudinal direction Y of the electric wire 50 and the extending direction of the in-slot portions 51. Consequently, with the crank-shaped parts 54, the electric wire 50 is stepped to successively offset the in-slot portions 51 in the direction perpendicular to both the longitudinal direction Y and the extending direction of the in-slot portions 51. It should be noted that the term "crank-shaped" is used here only for the purpose of describing the overall shape of the parts 54 and does not restrict the internal angles between adjacent sections of the parts 54 to 90°.

Figure 12A:
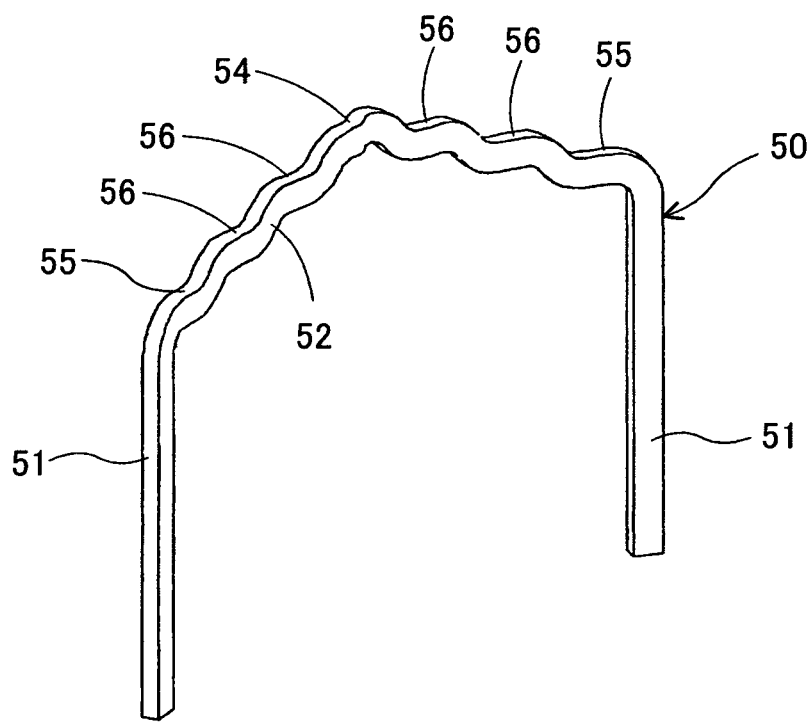
FIG. 12A is a perspective view illustrating a turn portion of one of the electric wires.
Figure 12B:
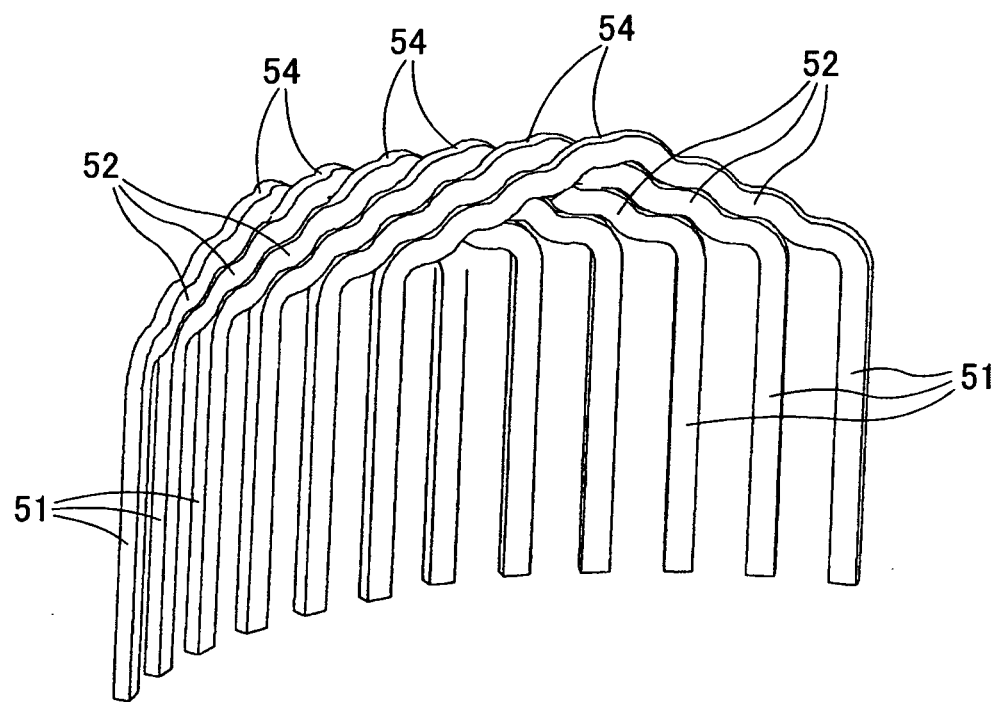
FIG. 12B is a perspective view illustrating a plurality of turn portions of the electric wires which are adjacent to one another.

Referring now to FIGS. 12A-12B, after forming the stator coil 40 with the electric wires 50 and assembling the stator core 30 to the stator coil 40, each of the turn portions 52 (i.e., 52A-52K) of the electric wires 50 is offset by the crank-shaped part 54 formed therein in a radial direction of the stator core 30. In addition, though not shown in FIGS. 12A-12B, each of the crank-shaped parts 54 formed in the turn portions 52 of the electric wires 50 extends parallel to a corresponding axial end face 30a of the stator core 30.

Further, in the present embodiment, the amount of radial offset made by each of the crank-shaped parts 54 is set to be equal to the radial thickness of the in-slot portions 51 of the electric wires 50. Here, the amount of radial offset made by each of the crank-shaped parts 54 is defined as the difference in radial position between the opposite ends of the crank-shaped part 54. Accordingly, for each of the electric wires 50, the difference in radial position between each adjacent pair of the in-slot portions 51, which are connected by a corresponding one of the turn portions 52, is equal to the radial thickness (i.e., thickness in the radial direction of the stator core 30) of the in-slot portions 51.

Setting the amount of radial offset as above, it is possible to arrange each adjacent pair of the turn portions 52 of the electric wires 50 in intimate contact with each other, as shown in FIG. 12B. As a result, the radial thickness of the coil end parts 42 of the stator coil 40 can be minimized. In addition, it is also possible to make each adjacent pair of the turn portions 52 of the electric wires 50 extend in the circumferential direction of the stator core without interference therebetween.

Moreover, as shown in FIGS. 12A-12B, each of the turn portions 52 of the electric wires 50 includes a pair of shoulder parts 55 which respectively adjoin the pair of the in-slot portions 51 connected by the turn portion 52 and both extend perpendicular to the pair of the in-slot portions 51 (or parallel to the corresponding axial end face 30a of the stator core 30). Consequently, with the shoulder parts 55, the protruding height of each of the turn portions 52 from the corresponding axial end face 30a of the stator core 30 can be reduced. As a result, the axial length of the coil end parts 42 of the stator coil 40 can be reduced. In addition, the coil end parts 42 of the stator coil 40 are each comprised of those of the turn portions 52 of the electric wires 50 which are located on the same axial side of the stator core 30.

Further, in the present embodiment, there is specified the following dimensional relationship: $d1 \leq d2$, where d1 is the length of each of the shoulder parts 55 of the electric wires 50 in the circumferential direction of the stator core 30 and d2 is the distance between each circumferentially-adjacent pair of the slots 31 of the stator core 30.

Specifying the above relationship, it is possible to prevent interference between each pair of the turn portions 52 of the electric wires 50 which respectively protrude from one circumferentially-adjacent pair of the slots 31 of the stator core 30. Consequently, it is possible to prevent both the axial length and radial thickness of the coil end parts 42 of the stator coil 40 from being increased for preventing the above-described interference.

Furthermore, as shown in FIGS. 12A-12B, each of the turn portions 52 of the electric wires 50 further includes two shoulder parts 56 between the crank-shaped part 54 and each of the shoulder parts 55. Accordingly, each of the turn portions 52 of the electric wires 50 includes one crank-shaped part 54, two shoulder parts 55, and four shoulder parts 56. Each of the shoulder parts 56 extends, like the shoulder parts 55, perpendicular to the in-slot portions 51 (or parallel to the corresponding axial end face 30a of the stator core 30). Consequently, with the shoulder parts 56, the protruding height of each of the turn portions 52 from the corresponding axial end face 30a of the stator core 30 can be further reduced. As a result, the axial length of the coil end parts 42 of the stator coil 40 can be further reduced.

In addition, each of the turn portions 52 of the electric wires 50 can be seen as being stepped on both sides of the crank-shaped part 54 to reduce its protruding height from the corresponding axial end face 30a of the stator core 30.

In the present embodiment, the stator coil 40 is formed with the 48 electric wires 50 as shown in FIGS. 11A-11B. It should be noted that the crossover parts 70 may be omitted from some of the electric wires 50 for facilitating the formation of the U-phase, V-phase, and W-phase output terminals and the U-phase, V-phase, and W-phase neutral terminals in the stator coil 40. However, in any case, it is preferable that all of the electric wires 50 have the same shape at least between the lead portions 53a and 53b.

In forming the stator coil 40, the 48 electric wires 50 are first stacked one by one so that the longitudinal directions Y of the electric wires 50 are parallel to each other and the first in-slot portions 51A of the electric wires 50 are offset from one another in the longitudinal directions Y by one slot pitch of the stator core 30 (i.e., the circumferential distance between the centers of each adjacent pair of the slots 31 of the stator core 30). Consequently, the band-shaped electric wire assembly 45 as shown in FIGS. 13A-13B is obtained. The assembly 45 has a pair of stepped surfaces 45a that are respectively formed at opposite longitudinal ends of the assembly 45 to face in opposite directions.

In addition, in FIG. 13A, the first electric wire 50 (to be denoted by 50a hereinafter) in the stacking of the electric wires 50 is located at the left end and the bottom of the electric wire assembly 45; the last electric wire 50 (to be denoted by 50b hereinafter) in the stacking of the electric wires 50 is located at the right end and the top of the assembly 45.

The band-shaped electric wire assembly 45 is then rolled to have the shape of a hollow cylinder with a constant radial thickness in the circumferential direction. More specifically, as shown in FIG. 13A, the band-shaped electric wire assembly 45 is rolled from the left end in the counterclockwise direction Z, bringing the two stepped surfaces 45a into complete contact with each other.

Consequently, as shown in FIG. 13C, each of the electric wires 50 included in the assembly 45 is rolled by one and a half turns into a spiral shape. Accordingly, in the finally-obtained stator 20, when viewed along the longitudinal axis O of the stator core 30, each of the electric wires 50 spirally extends around the axis O of the stator core 30 (see FIG. 16).

Thereafter, corresponding pairs of the lead portions 53a and 53b of the electric wires 50 are joined together by, for example, welding. As a result, the stator coil 40 as shown in FIGS. 6-9 is obtained.

In the stator coil 40, those of the turn portions 52 of the electric wires 50 which are located most radially outward do not protrude radially outward from those of the in-slot portions 51 of the electric wires 50 which are located most radially outward in the slots 31 of the stator core 30. Consequently, the outside diameter of the coil end parts 42 of the stator coil 40 can be limited.

Figure 6:
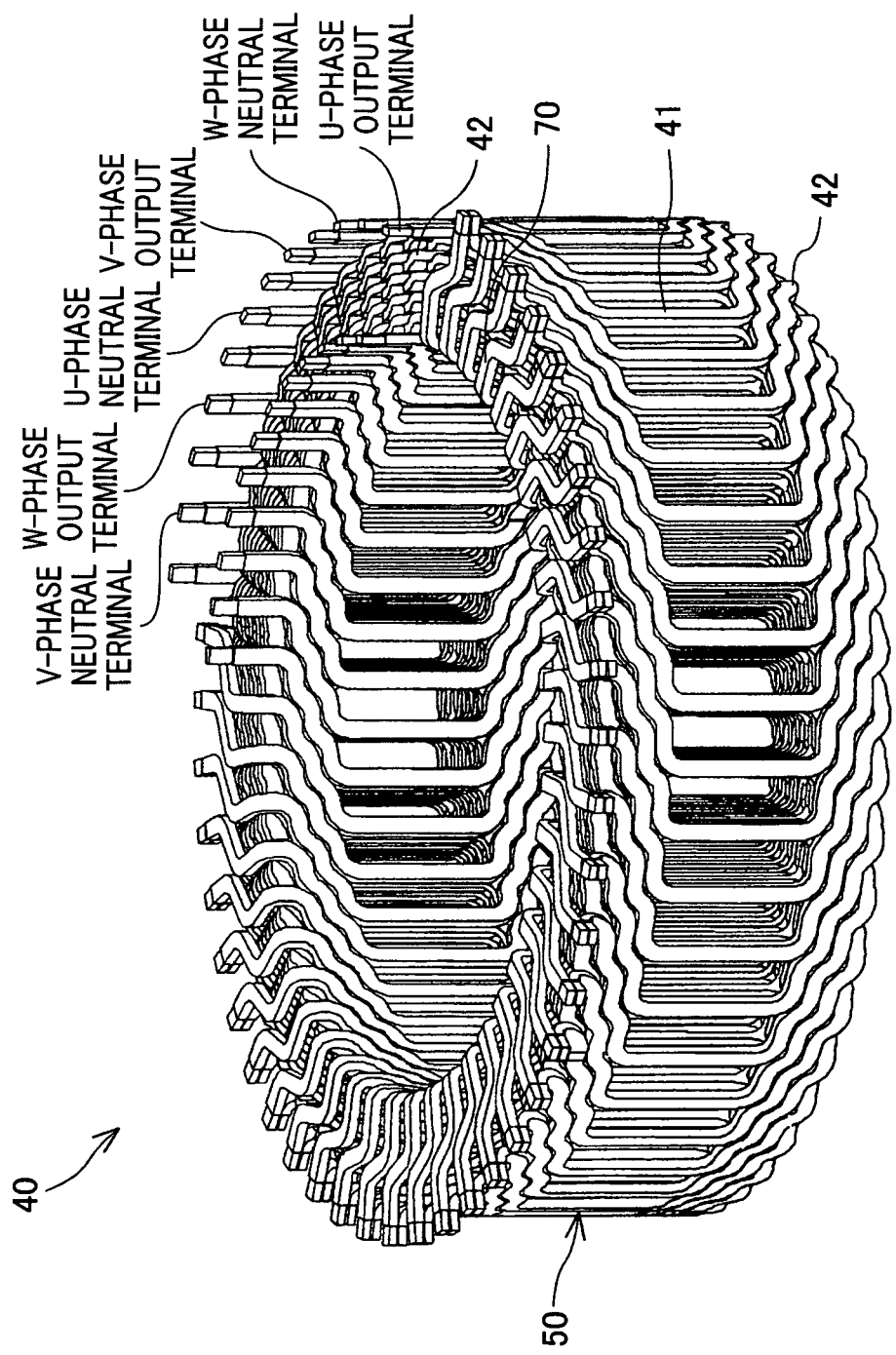
FIG. 6 is a perspective view of a stator coil of the stator.
Figure 7:
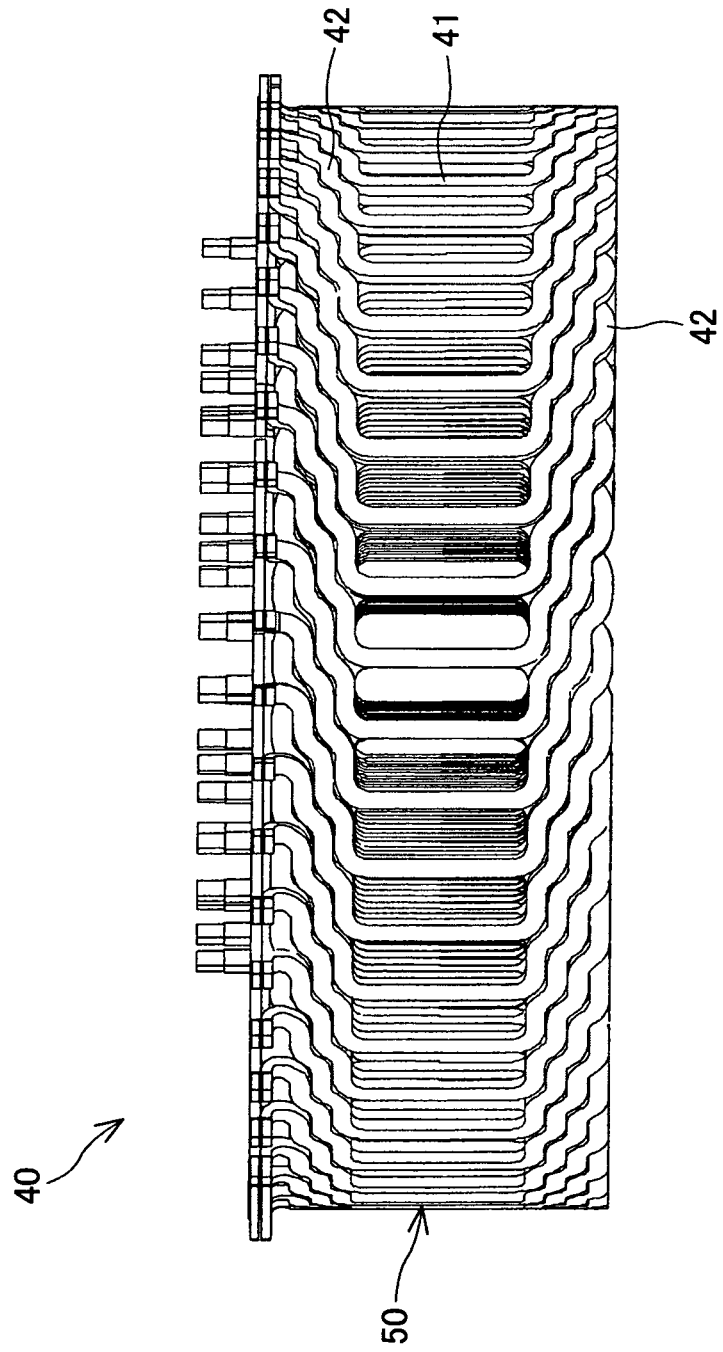
FIG. 7 is a side view of the stator coil.

As described previously, each of the turn portions 52 of the electric wires 50 includes, substantially at the center thereof, the crank-shaped part 54 by which the turn portion 52 is radially offset by the radial thickness of the in-slot portions 51. Accordingly, for each of the electric wires 50, the difference in radial position between each adjacent pair of the in-slot portions 51, which are connected by a corresponding one of the turn portions 52, is equal to the radial thickness of the in-slot portions 51. Moreover, for each of the electric wires 50, the first in-slot portion 51A is located most radially outward while the twelfth in-slot portion 51L is located most radially inward; the predetermined pitches X between the in-slot portions 51A-51L gradually decrease in a direction from the first in-slot portion S1A to the twelfth in-slot portion 51L (see FIG. 11B). Consequently, those of the in-slot portions 51 of the electric wires 50 which are stacked in a radial direction of the stator coil 40 (or a radial direction of the stator core 30) can be aligned straight in the radial direction, thereby allowing the stator coil 40 to have a substantially perfect hollow-cylindrical shape as shown in FIGS. 6 and 7.

Furthermore, all of the ith in-slot portions 51 of the 48 electric wires 50 are located respectively in the 48 slots 31 of the stator core 30 at the same radial position, where i=1, 2, ..., 12. For example, all of the first in-slot portions 51A of the 48 electric wires 50 are located respectively in the 48 slots 31 and positioned most radially outward in the respective slots 31; all of the twelfth in-slot portions 51L of the 48 electric wires 50 are located respectively in the 48 slots 31 and positioned most radially inward in the respective slots 31. With the above location of the in-slot portions 51 of the electric wires 50, both the outside and inside diameters of the stator coil 40 can be made uniform in the circumferential direction of the stator core 30.

Figure 14:
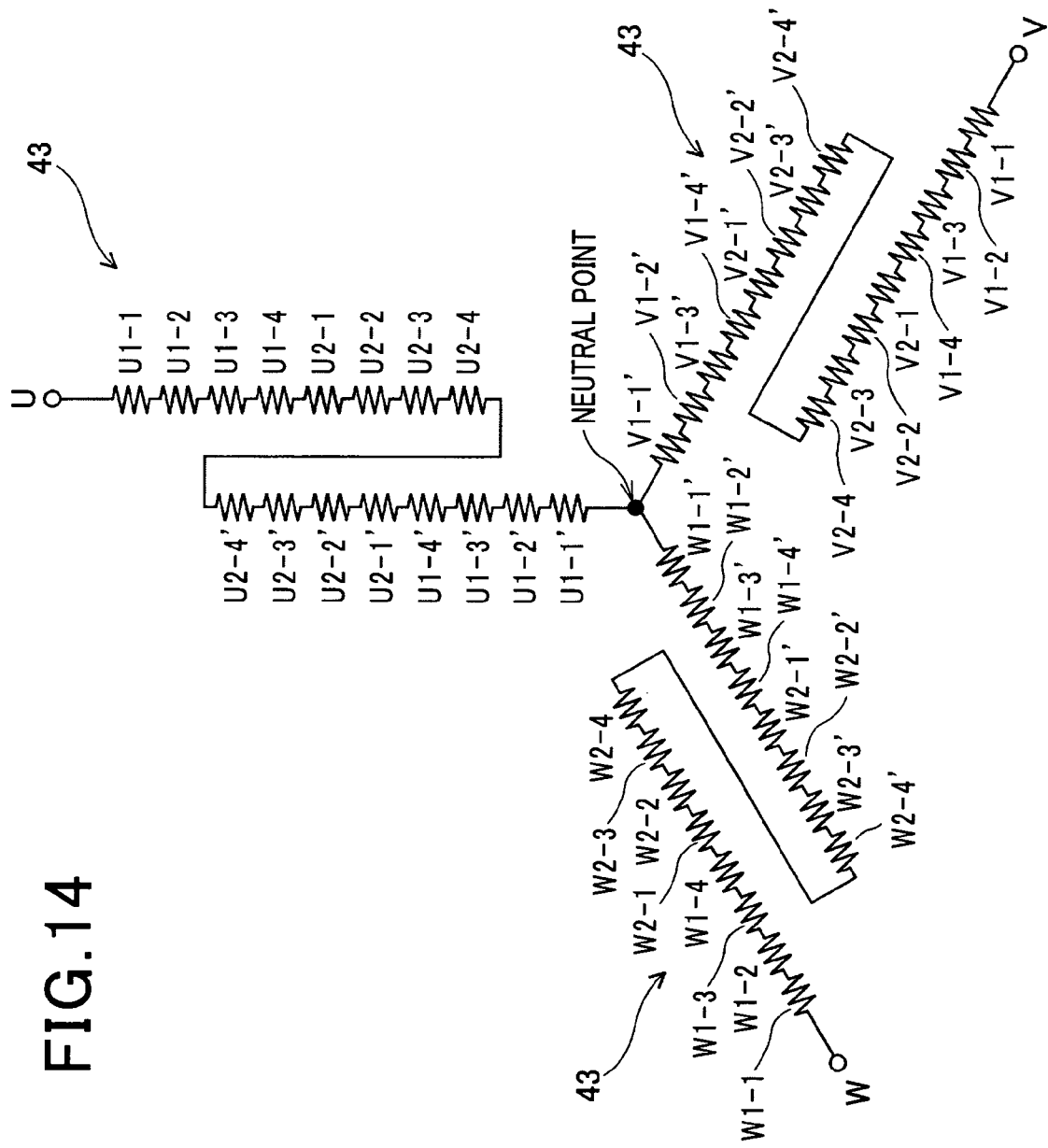
FIG. 14 is a circuit diagram of the stator coil.

In the present embodiment, as shown in FIG. 14, the stator coil 40 is formed as a three-phase coil which is comprised of three phase windings (i.e., U-phase, V-phase, and W-phase windings) 43. Each of the U-phase, V-phase, and W-phase windings 43 is formed by serially connecting 16 electric wires 50. Further, the U-phase output and neutral terminals are respectively formed at the opposite ends of the U-phase winding 43; the V-phase output and neutral terminals are respectively formed at the opposite ends of the V-phase winding 43; and the W-phase output and neutral terminals are respectively formed at the opposite ends of the W-phase winding 43. Furthermore, the U-phase, V-phase, and W-phase windings 43 are Y-connected to define a neutral point therebetween. That is, the U-phase, V-phase, and W-phase neutral terminals of the U-phase, V-phase, and W-phase windings 43 are joined together at the neutral point. Consequently, three-phase AC power is input to or output from the stator coil 40 via the U-phase, V-phase, and W-phase output terminals.

Figure 15:
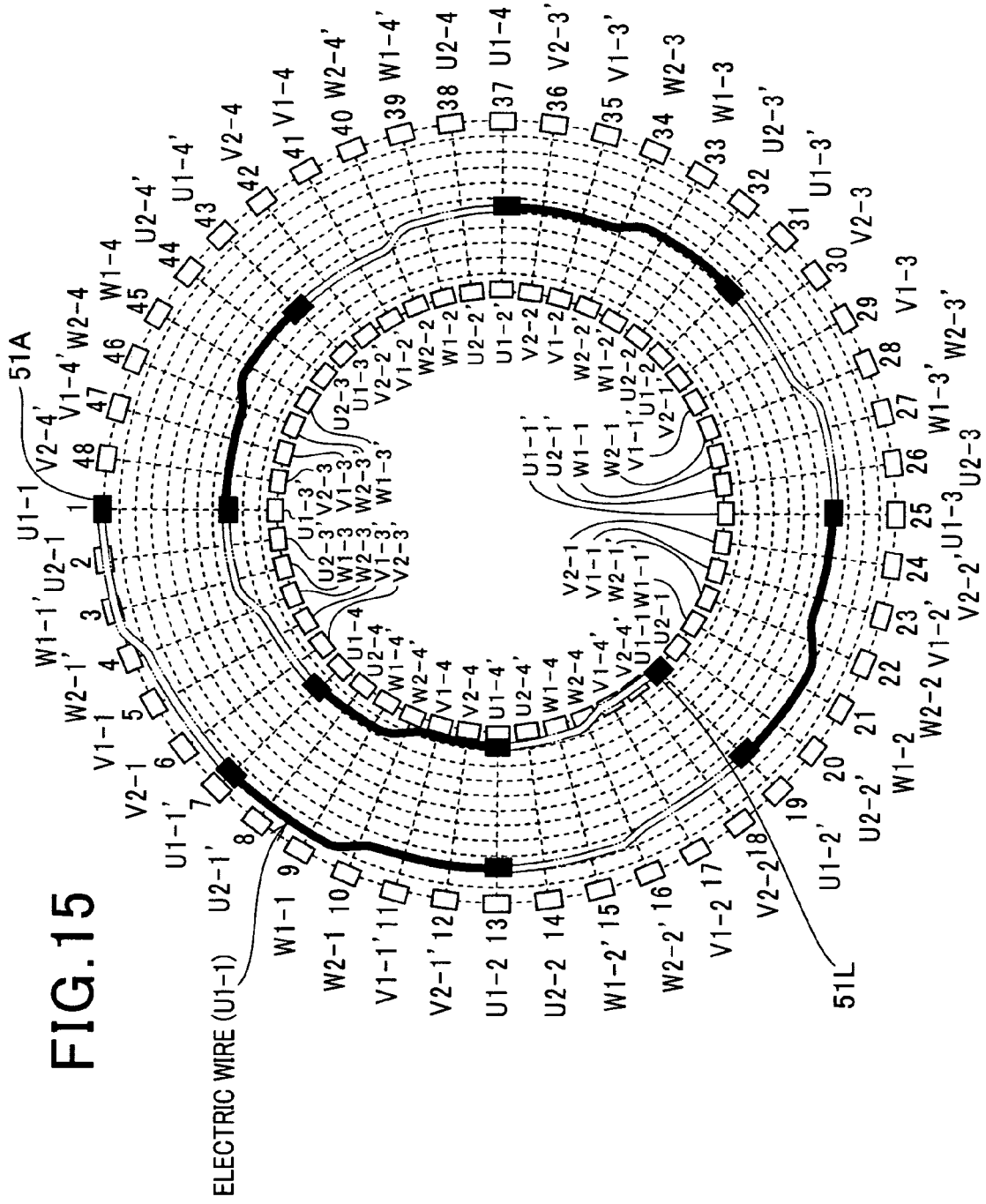
FIG. 15 is a schematic view illustrating the location of the radially-outermost in-slot portion of each of the electric wires in the stator core.
Figure 16:
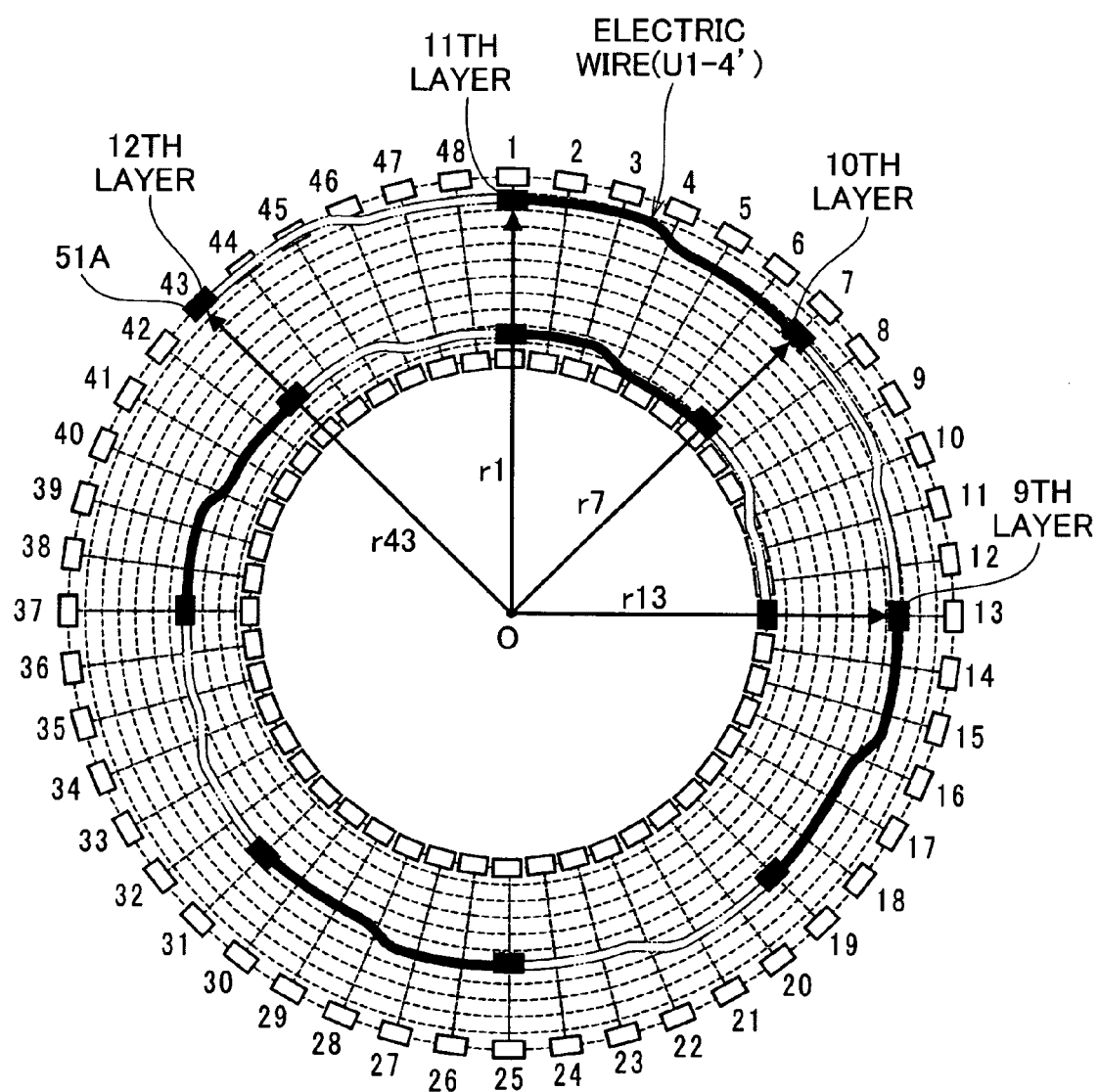
FIG. 16 is a schematic view illustrating the manner of extension of the electric wire labeled (U1-4') when viewed along the longitudinal axis O of the stator core.

In FIGS. 15 and 16, the intersections between 12 dashed-line circles and 48 radially-extending dashed lines represent the positions of the in-slot portions 51 of the electric wires 50. In addition, among the positions of the in-slot portions 51, only the radially outermost and radially innermost ones are denoted by rectangles.

It can be seen from FIGS. 15 and 16 that in the present embodiment, in each of the slots 31 of the stator core 30, the in-slot portions 51 of the electric wires 50 are radially stacked in 12 layers.

Further, in FIGS. 15 and 16, the numbers 1-48 of the slots 31 of the stator core 30 are respectively shown radially outside of the 48 radially-extending dashed lines. In addition, in FIG. 15, each of the 48 electric wires 50 is labeled radially outside of the slot 31 in which the first in-slot portion 51A of the electric wire 50 is located most radially outward (i.e., located at the twelfth layer in the slot 31); each of the 48 electric wires 50 is also labeled radially inside of the slot 31 in which the twelfth in-slot portion 51L of the electric wire 50 is located most radially inward (i.e., located at the first layer in the slot 31).

In the present embodiment, each of the U-phase, V-phase, and W-phase windings 43 of the stator coil 40 is formed with first and second electric wire groups each consisting of eight electric wires 50. The in-slot portions 51 of the electric wires 50 of the first group are received in eight common slots 31 of the stator core 30. Similarly, the in-slot portions 51 of the electric wires 50 of the second group are also received in another eight common slots 31 of the stator core 30. That is, the in-slot portions 51 of the electric wires 50 of the first group are received in different slots 31 from the in-slot portions 51 of the electric wires 50 of the second group.

For example, the U-phase winding 43 is formed with a first electric wire group, which consists of the electric wires 50 labeled (U1-1) to (U1-4) and (U1-1') to (U1-4), and a second electric wire group that consists of the electric wires 50 labeled (U2-1) to (U2-4) and (U2-1') to (U2-4'). The in-slot portions 51 of the (U1-1) to (U1-4) and (U1-1') to (U1-4') electric wires 50 are received in the Nos. 1, 7, 13, 19, 25, 31, 37, and 43 slots 31 of the stator core 30. On the other hand, the in-slot portions 51 of the (U2-1) to (U2-4) and (U2-1) to (U2-4') electric wires 50 are received in the Nos. 2, 8, 14, 20, 26, 32, 38, and 44 slots 31 of the stator core 30.

FIG. 15 illustrates, from one axial side of the stator core 30, the arrangement of each of the 48 electric wires 50 by taking the (U1-1) electric wire 50 as an example. Specifically, in FIG. 15, the positions of the in-slot portions 51 of the (U1-1) electric wire 50 are denoted by black rectangles; those of the turn portions 52 of the (U1-1) electric wire 50 which are located on the one axial side of the stator core 30 (i.e., on the front side of the paper surface of FIG. 15) are denoted by circumferentially-extending heavy lines; and those of the turn portions 52 of the (U1-1) electric wire 50 which are located on the other axial side of the stator core 30 (i.e., on the rear side of the paper surface of FIG. 15) are denoted by circumferentially-extending two-dot dashed lines. As seen from FIG. 15, for the (U1-1) electric wire 50, the first in-slot portion 51A is located at the twelfth layer (i.e., the radially outermost layer) in the No. 1 slot 31; the twelfth in-slot portion 51L is located at the first layer (i.e., the radially innermost layer) in the No. 19 slot 31; the first to the twelfth in-slot portions 51A-51L are circumferentially spaced at a six-slot pitch; and the radial positions of the in-slot portions 51A-51L are successively offset radially inward by one layer each time.

FIG. 16 illustrates, from the other axial side of the stator core 30, the arrangement of each of the 48 electric wires 50 by taking the (U1-4') electric wire 50 as an example. Specifically, in FIG. 16, the positions of the in-slot portions 51 of the (U1-4') electric wire 50 are denoted by black rectangles; those of the turn portions 52 of the (U1-4') electric wire 50 which are located on the other axial side of the stator core 30 (i.e., on the front side of the paper surface of FIG. 16) are denoted by circumferentially-extending heavy lines; and those of the turn portions 52 of the (U1-4) electric wire 50 which are located on the one axial side of the stator core 30 (i.e., on the rear side of the paper surface of FIG. 16) are denoted by circumferentially-extending two-dot dashed lines. As seen from FIG. 16, for the (U1-4) electric wire 50, the first in-slot portion 51A is located at the twelfth layer in the No. 43 slot 31; the twelfth in-slot portion 51L is located at the first layer in the No. 13 slot 31; the first to the twelfth in-slot portions 51A-51L are circumferentially spaced at a six-slot pitch; and the radial positions of the in-slot portions 51A-51L are successively offset by one layer each time.

As described previously, in the present embodiment, the stator core 30 has the 48 slots 31 formed therein, while the stator coil 40 is formed with the 48 electric wires 50. The electric wires 50 are mounted on the stator core 30 so that they are offset from one another in the circumferential direction of the stator core 30 by one slot pitch of the stator core 30. Consequently, the first in-slot portions 51A of the 48 electric wires 50 are respectively located at the radially outermost layers (i.e., the twelfth layers) in the 48 slots 31; the twelfth in-slot portions 51L of the 48 electric wires 50 are respectively located at the radially innermost layers (i.e., the first layers) in the 48 slots 31.

FIG. 17 shows both the label of the electric wire 50 located at the radially outermost layer and the label of the electric wire 50 located at the radially innermost layer in each of the slots 31 of the stator core 30.

In the present embodiment, for each of the 48 electric wires 50 forming the stator coil 40, the radial distances from the axis O of the stator core 30 to the in-slot portions 51 of the electric wire 50 successively decrease in the sequence from the first in-slot portion 51A to the twelfth in-slot portion 51L. Moreover, for each of the 48 electric wires 50, the difference in radial distance from the axis O of the stator core 30 between each adjacent pair of the in-slot portions 51, which are connected by a corresponding one of the turn portions 52, is equal to the radial thickness of the in-slot portions 51.

For example, referring back to FIG. 16, for the (U1-4') electric wire 50, there is satisfied the following relationship: r43>r1>r7>r13. Here, r43 represents the radial distance from the axis O of the stator core 30 to the first in-slot portion 51A that is located at the twelfth layer in the No, 43 slot 31; r1 represents the radial distance from the axis O to the second in-slot portion 51B that is located at the eleventh layer in the No. 1 slot 31; r7 represents the radial distance from the axis O to the third in-slot portion 51C that is located at the tenth layer in the No. 7 slot 31; and r13 represents the radial distance from the axis O to the fourth in-slot portion 51D that is located at the ninth layer in the No. 13 slot 31. Further, the radial distances r43, r1, r7, and r13 successively decrease in decrements of the radial thickness of the in-slot portions 51.

Figure 18:
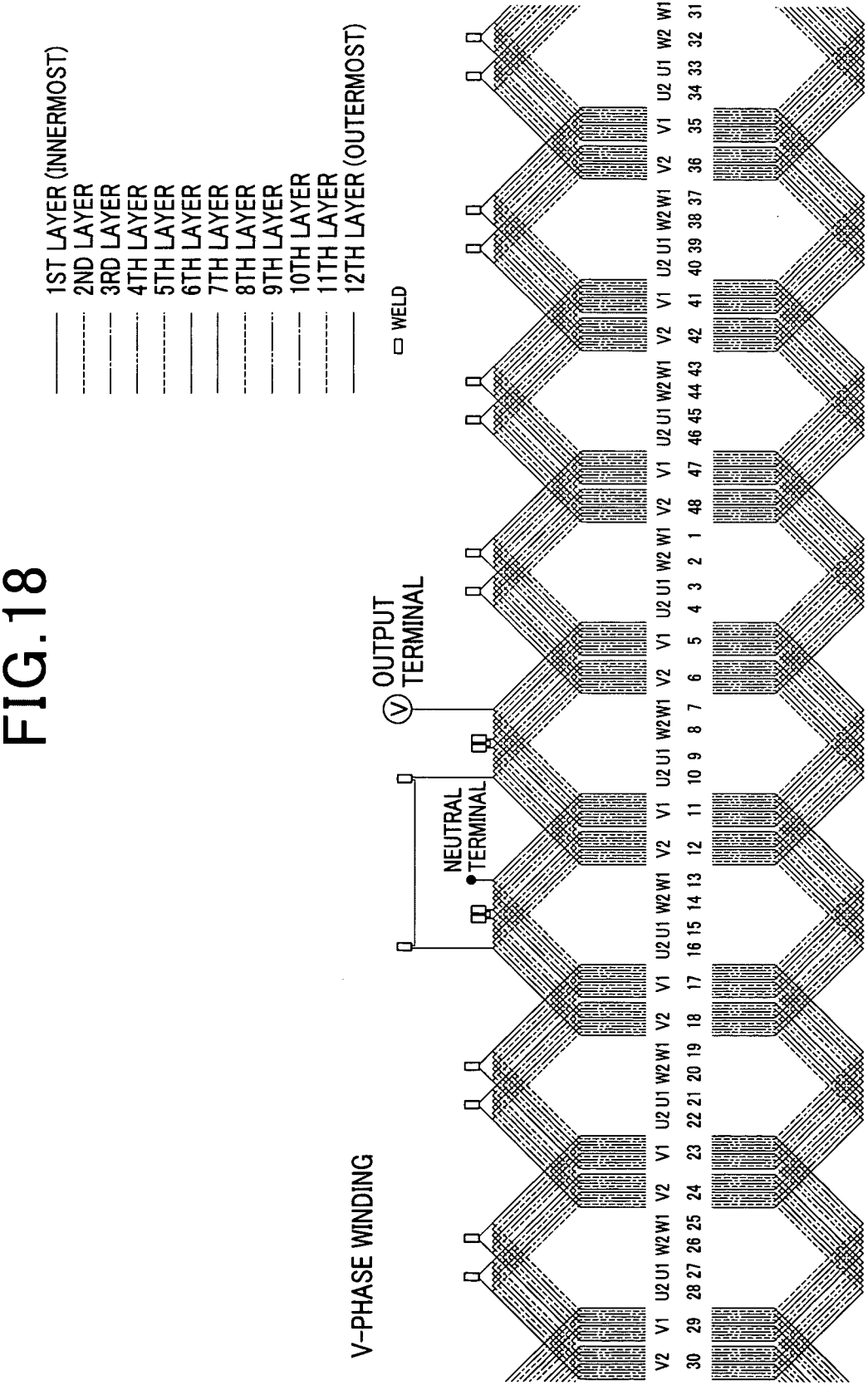
FIG. 18 is a schematic view illustrating the connection between those of the electric wires which together form a V-phase winding of the stator coil when viewed from the radially inner side of the stator core.

Next, with reference to FIGS. 14 and 17-18, the manner of serially connecting the 16 electric wires 50 for forming the V-phase winding 43 of the stator coil 40 will be described. In addition, it should be noted that the electric wires 50 for forming the U-phase and W-phase windings 43 of the stator coil 40 are also connected in the same manner as those for forming the V-phase winding 43.

As shown in FIG. 14, the U-phase winding 43 is formed by serially connecting the (V1-1) to (V1-4), (V1-1') to (V1-V4'), (V2-1) to (V2-4), and (V2-1') to (V2-4') electric wires 50.

Specifically, to the U-phase output terminal, there is connected the first in-slot portion 51A-side end of the (V1-1) electric wire 50. Moreover, as shown in FIGS. 17 and 18, for the (V1-1) electric wire 50, the first in-slot portion 51A is located at the radially outermost layer (i.e., the twelfth layer) in the No. 5 slot 31 of the stator core 30, while the twelfth in-slot portion 51L is located at the radially innermost layer (i.e., the first layer) in the No. 23 slot 31.

To the twelfth in-slot portion 51L-side end of the (V1-1) electric wire 50, there is connected the first in-slot portion 51A-side end of the (V1-2) electric wire 50. Moreover, for the (V1-2) electric wire 50, the first in-slot portion 51A is located at the radially outermost layer in the No. 17 slot 31, while the twelfth in-slot portion 51L is located at the radially innermost layer in the No. 35 slot 31.

To the twelfth in-slot portion 51L-side end of the (V1-2) electric wire 50, there is connected the first in-slot portion 51A-side end of the (V1-3) electric wire 50. Moreover, for the (V1-3) electric wire 50, the first in-slot portion 51A is located at the radially outermost layer in the No. 29 slot 31, while the twelfth in-slot portion 51L is located at the radially innermost layer in the No. 47 slot 31.

To the twelfth in-slot portion 51L-side end of the (V1-3) electric wire 50, there is connected the first in-slot portion 51A-side end of the (V1-2) electric wire 50. Moreover, for the (V1-2) electric wire 50, the first in-slot portion 51A is located at the radially outermost layer in the No. 41 slot 31, while the twelfth in-slot portion 51L is located at the radially innermost layer in the No. 11 slot 31.

To the twelfth in-slot portion 51L-side end of the (V1-4) electric wire 50, there is connected the first in-slot portion 51A-side end of the (V2-1) electric wire 50. Moreover, for the (V2-1) electric wire 50, the first in-slot portion 51A is located at the radially outermost layer in the No. 6 slot 31, while the twelfth in-slot portion 51L is located at the radially innermost layer in the No. 24 slot 31.

To the twelfth in-slot portion 51L-side end of the (V2-1) electric wire 50, there is connected the first in-slot portion 51A-side end of the (V2-2) electric wire 50. Moreover, for the (V2-2) electric wire 50, the first in-slot portion 51A is located at the radially outermost layer in the No. 18 slot 31, while the twelfth in-slot portion 51L is located at the radially innermost layer in the No. 36 slot 31.

To the twelfth in-slot portion 51L-side end of the (V2-2) electric wire 50, there is connected the first in-slot portion 51A-side end of the (V2-3) electric wire 50. Moreover, for the (V2-3) electric wire 50, the first in-slot portion 51A is located at the radially outermost layer in the No. 30 slot 31, while the twelfth in-slot portion 51L is located at the radially innermost layer in the No. 48 slot 31.

To the twelfth in-slot portion 51L-side end of the (V2-3) electric wire 50, there is connected the first in-slot portion 51A-side end of the (V2-4) electric wire 50. Moreover, for the (V2-4) electric wire 50, the first in-slot portion 51A is located at the radially outermost layer in the No. 42 slot 31, while the twelfth in-slot portion 51L is located at the radially innermost layer in the No. 12 slot 31.

To the twelfth in-slot portion 51L-side end of the (V2-4) electric wire 50, there is connected the twelfth in-slot portion 51L-side end of the (V2-4') electric wire 50. Moreover, for the (V2-4') electric wire 50, the first in-slot portion 51A is located at the radially outermost layer in the No. 48 slot 31, while the twelfth in-slot portion 51L is located at the radially innermost layer in the No. 18 slot 31.

To the first in-slot portion 51A-side end of the (V2-4') electric wire 50, there is connected the twelfth in-slot portion 51L-side end of the (V2-3') electric wire 50. Moreover, for the (V2-3') electric wire 50, the first in-slot portion 51A is located at the radially outermost layer in the No. 36 slot 31, while the twelfth in-slot portion 51L is located at the radially innermost layer in the No. 6 slot 31.

To the first in-slot portion 51A-side end of the (V2-3') electric wire 50, there is connected the twelfth in-slot portion 51L-side end of the (V2-2') electric wire 50. Moreover, for the (V2-2') electric wire 50, the first in-slot portion 51A is located at the radially outermost layer in the No. 24 slot 31, while the twelfth in-slot portion 51L is located at the radially innermost layer in the No. 42 slot 31.

To the first in-slot portion 51A-side end of the (V2-2') electric wire 50, there is connected the twelfth in-slot portion 51L-side end of the (V2-1') electric wire 50. Moreover, for the (V2-1') electric wire 50, the first in-slot portion 51A is located at the radially outermost layer in the No. 12 slot 31, while the twelfth in-slot portion 51L is located at the radially innermost layer in the No. 30 slot 31.

To the first in-slot portion 51A-side end of the (V2-1') electric wire 50, there is connected the twelfth in-slot portion 51L-side end of the (V1-4') electric wire 50. Moreover, for the (V-4') electric wire 50, the first in-slot portion 51A is located at the radially outermost layer in the No. 47 slot 31, while the twelfth in-slot portion 51L is located at the radially innermost layer in the No. 17 slot 31.

To the first in-slot portion 51A-side end of the (V1-4') electric wire 50, there is connected the twelfth in-slot portion 51L-side end of the (V1-3') electric wire 50. Moreover, for the (V1-3') electric wire 50, the first in-slot portion 51A is located at the radially outermost layer in the No. 35 slot 31, while the twelfth in-slot portion 51L is located at the radially innermost layer in the No. 5 slot 31.

To the first in-slot portion 51A-side end of the (V1-3') electric wire 50, there is connected the twelfth in-slot portion 51L-side end of the (V1-2') electric wire 50. Moreover, for the (V1-2') electric wire 50, the first in-slot portion 51A is located at the radially outermost layer in the No. 23 slot 31, while the twelfth in-slot portion 51L is located at the radially innermost layer in the No. 41 slot 31.

To the first in-slot portion 51A-side end of the (V1-2') electric wire 50, there is connected the twelfth in-slot portion 51L-side end of the (V1-1') electric wire 50. Moreover, for the (V1-1') electric wire 50, the first in-slot portion 51A is located at the radially outermost layer in the No. 11 slot 31, while the twelfth in-slot portion 51L is located at the radially innermost layer in the No. 29 slot 31. In addition, the first in-slot portion 51A-side end of the (V1-1') electric wire 50 is connected to the V-phase neutral terminal of the stator coil 40.

Further, as described previously, each of the electric wires 50 has the lead portion 53a formed at the first in-slot portion 51A-side end thereof and the lead portion 53b formed at the twelfth in-slot portion 51L-side end thereof (see FIGS. 11A-11B). The lead portion 53a is connected to the first in-slot portion 51A via the half-turn portion 52M, and the lead portion 53b is connected to the twelfth in-slot portion 51L via the half-turn portion 52N. The lead portion 53b also has the crossover part 70 formed therein. In the present embodiment, the connection between the electric wires 50 is made by welding corresponding pairs of the lead portions 53a and 53b of the electric wires 50.

For example, the (V1-1) electric wire 50 has the first in-slot portion 51A located at the radially outermost layer in the No. 5 slot 31 of the stator core 30 and the twelfth in-slot portion 51L located at the radially innermost layer in the No. 23 slot 31. The lead portion 53b of the (V1-1) electric wire 50 is offset, by the length of the half-turn portion 52N in the circumferential direction of the stator core 30, from the No. 23 slot 31 to the vicinity of the No. 20 slot 31. On the other hand, the (V1-2) electric wire 50 has the first in-slot portion 51A located at the radially outermost layer in the No. 17 slot 31 and the twelfth in-slot portion 51L located at the radially innermost layer in the No. 35 slot 31. The lead portion 53a of the (V1-2) electric wire 50 is offset, by the length of the half-turn portion 52M in the circumferential direction of the stator core 30, from the No. 17 slot 31 to the vicinity of the No. 20 slot 31. Further, as shown in FIGS. 6-9, the lead portion 53b of the (V1-1) electric wire 50 is bent radially outward substantially at a right angle to extend from the radially inner periphery of the stator coil 40 to the lead portion 53a of the (V1-2) electric wire 50 which is located on the radially outer periphery of the stator coil 40; then, the lead portion 53b of the (V1-1) electric wire 50 is welded to the lead portion 53a of the (V1-2) electric wire 50. In other words, the twelfth in-slot portion 51L-side end of the (V1-1) electric wire 50 is joined to the first in-slot portion 51A-side end of the (V1-2) electric wire 50 by welding.

Moreover, in the present embodiment, all of the corresponding pairs of the lead portions 53a and 53b of the electric wires 50 are welded radially outside of the radially outermost turn portions 52 of the electric wires 50. To this end, each of the lead portions 53b of the electric wires 50 is configured to include the crossover part 70 that crosses over the annular axial end face of the stator coil 40 (more specifically, the annular axial end face of the coil end part 42 of the stator coil 40 which is comprised of the turn portions 52 of the electric wires 50) from the radially inside to the radially outside of the axial end face. Consequently, it is possible to reliably prevent the twelfth in-slot portions 51L of the electric wires 50, which are located most radially inward in the slots 31 of the stator core 30, from protruding radially inward. As a result, it is possible to reliably prevent the stator coil 40 from interfering with the rotor of the electric rotating machine which is located radially inside of the stator 20.

Figure 8:
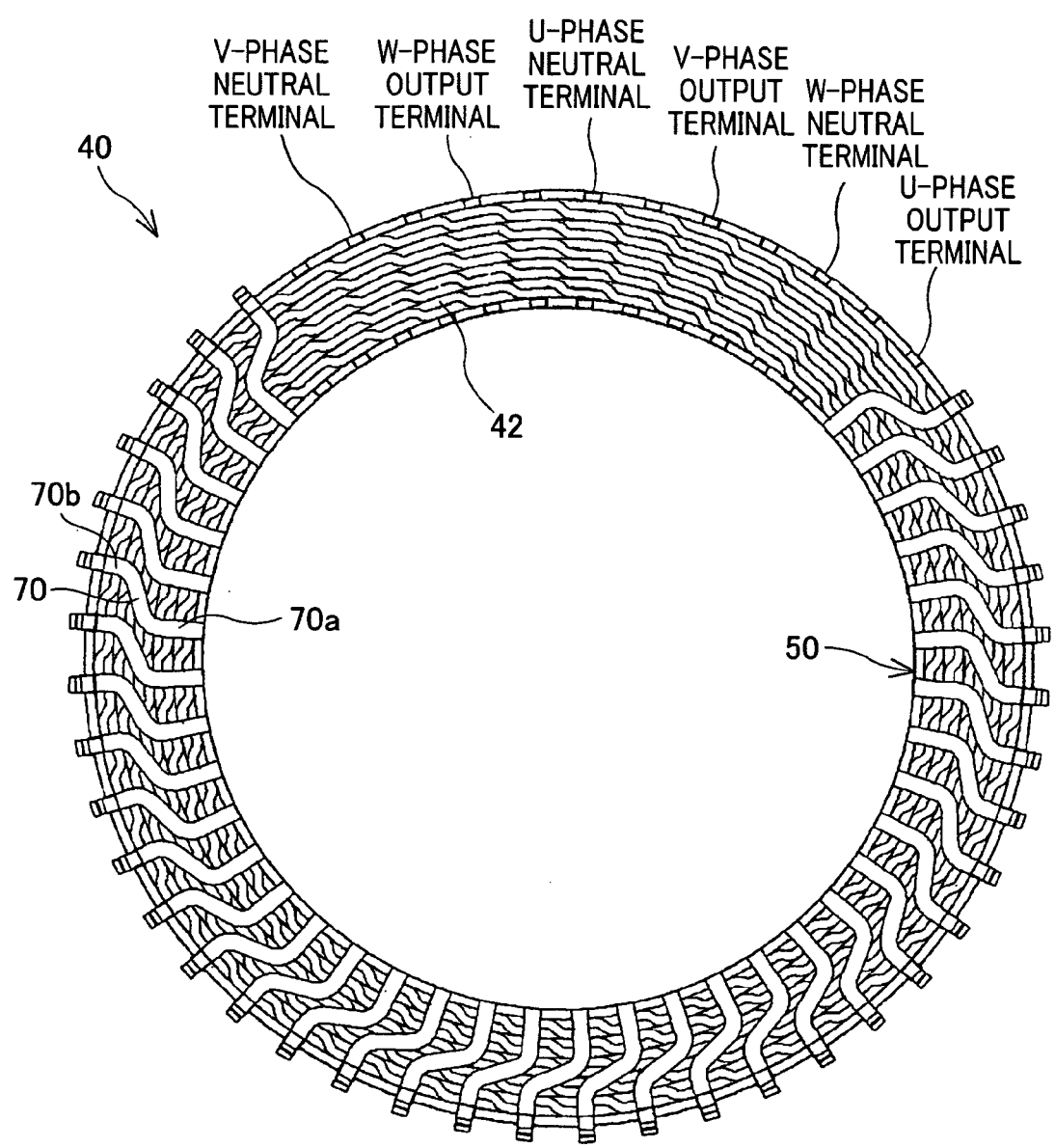
FIG. 8 is a top view of the stator coil.
Figure 9:
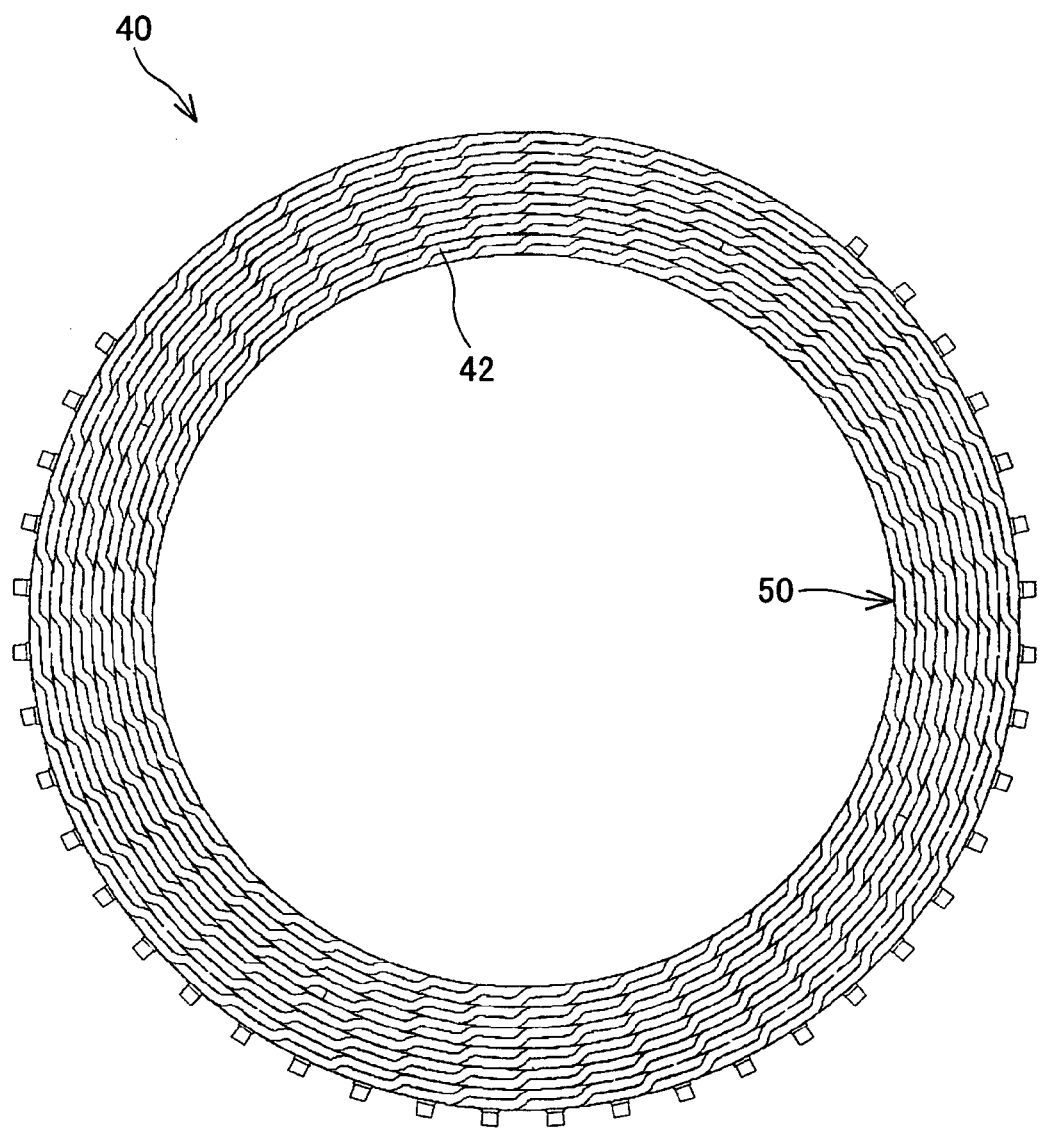
FIG. 9 is a bottom view of the stator coil.

Furthermore, in the present embodiment, as shown in FIG. 8, each of the crossover parts 70 of the electric wires 50 is crank-shaped to include a pair of radially-extending end sections 70a and 70b. With such a shape, it is possible to facilitate the bending of the lead portions 53b of the electric wires 50 for forming the crossover parts 70 and the welding of the corresponding pairs of the lead portions 53a and 53b of the electric wires 50.

In addition, as shown in FIGS. 6 and 8, on the annular axial end face of the stator coil 40, the crossover parts 70 occupy substantially ¾ of the full angular range of the axial end face; the full angular range is 360°. Further, within the remaining ¼ of the full angular range, there are sequentially arranged the V-phase neutral terminal, the W-phase output terminal, the U-phase neutral terminal, the V-phase output terminal, the W-phase neutral terminal, and the U-phase output terminal of the stator coil 40. That is, on the axial end face of the stator coil 40, the U-phase, V-phase, and W-phase output terminals are arranged in the same angular range as the U-phase, V-phase, and W-phase neutral terminals; the crossover parts 70 are arranged in a different angular range from the U-phase, V-phase, and W-phase output terminals and the U-phase, V-phase, and W-phase neutral terminals.

The stator core 30 is assembled to the above-described stator coil 40 by inserting the tooth portions 33 of the stator core segments 32 into the spaces formed between the stacks of the in-slot portions 51 of the electric wires 50 from the radially outside of the stator coil 40. Consequently, each of the in-slot portions 51 of the electric wires 50 forming the stator coil 40 is received in a corresponding one of the slots 31 of the stator core 30. More specifically, for each of the electric wires 50, each adjacent pair of the in-slot portions 51 are respectively received in a corresponding pair of the slots 31 of the stator core 30 which are circumferentially spaced at a six-slot pitch. Moreover, each of the turn portions 52, which connects a corresponding pair of the in-slot portions 51, protrudes from a corresponding one of the axial end faces of the stator core 30.

The above-described stator 20 according to the present embodiment has the following advantages.

In the present embodiment, the stator 20 includes the hollow cylindrical stator core 30 and the stator coil 40. The stator core 30 has the 48 slots 31 that are formed in the radially inner surface of the stator core 30 and spaced in the circumferential direction of the stator core 30. The stator coil 40 is comprised of the 48 electric wires 50 mounted on the stator core 30. Each of the electric wires 50 has the first to the twelfth in-slot portions 51A-51L and the first to the eleventh turn portions 52A-52K. The twelve (i.e., n=12) in-slot portions 51A-51L are sequentially received in eight (i.e., p=8, p being an integer not greater than n) slots 31 of the stator core 30. The eleven (i.e., (n−1)=11) turn portions 52A-52K are alternately located on the opposite axial sides of the stator core 30 outside of the slots 31 to connect corresponding adjacent pairs of the first to the twelfth in-slot portions 51A-51L. Each of the electric wires 50 also has the pair of the lead portions (or first and second end portions) 53a and 53b. The lead portion 53a is positioned on the first in-slot portion 51A side; in other words, the lead portion 53a is closer to the first in-slot portion 51A than any other of the in-slot portions 51 of the electric wire 50. On the other hand, the lead portion 53b is positioned on the twelfth in-slot portion 51L side; in other words, the lead portion 53b is closer to the twelfth in-slot portion 51L than any other of the in-slot portions 51 of the electric wire 50. Moreover, the first in-slot portions 51A of the electric wires 50 are located most radially outward and the twelfth in-slot portions 51L are located most radially inward in the slots 31 of the stator core 30. The stator coil 40 is a three-phase stator coil which is comprised of the U-phase, V-phase, and W-phase windings 43. Each of the U-phase, V-phase, and W-phase windings 43 is formed by connecting 16 electric wires 50. Furthermore, the 16 electric wires 50 include at least a pair of the electric wires 50 one of which has its lead portion 53a connected to the lead portion 53b of the other.

With the above configuration, since each of the phase windings 43 of the stator coil 40 is formed of the 16 electric wires 50, it is possible to shorten the length of each of the electric wires 50. Consequently, the electric wires 50 can be shaped using a small-scale shaping machine and be easily handled during the manufacture of the stator 20. As a result, it is possible to achieve a high productivity and a low cost of the stator 20. Furthermore, since the first in-slot portions 51A of the electric wires 50 are located most radially outward and the twelfth in-slot portions 51L are located most radially inward in the slots 31 of the stator core 30, the lead portions 53a and 53b of each of the electric wires 50 can be respectively drawn from the radially inner and radially outer peripheries of the stator core 30. Consequently, each corresponding pair of the lead portions 53a and 53b of the electric wires 50 can be respectively drawn from two sufficiently-distant places. As a result, flexibility is improved in the connecting of the electric wires 50.

In the present embodiment, the stator coil 40 is obtained by first stacking the electric wires 50 to form the band-shaped electric wire assembly 45 and then rolling the assembly 45 into the hollow cylindrical shape.

That is, the stator coil 40 can be formed without performing a process of interlacing the electric wires 50. Consequently, it is possible to reduce both the manufacturing time and cost of the stator coil 40. In addition, with the shortened length of the electric wires 50, it is possible to facilitate the stacking and rolling processes for forming the stator coil 40.

In the present embodiment, the number of the electric wires 50 forming the stator coil 40 is equal to 48; the number of the slots 31 formed in the stator core 30 is also equal to 48. That is, the number of the electric wires 50 is equal to that of the slots 31.

With the above configuration, it is possible to regularly arrange the electric wires 50 in the stator core 30 so that they are offset from one another in the circumferential direction of the stator core 30 by one slot pitch of the stator core 30. Consequently, it is possible to form the stator coil 40 to have a substantially perfect hollow-cylindrical shape. In addition, with the substantially perfect hollow-cylindrical shape of the stator coil 40, it is possible to ensure a high performance of the electric rotating machine.

In the present embodiment, each of the lead portions 53b of the electric wires 50 is bent outward in a radial direction of the stator core 30 and connected to a corresponding one of the lead portions 53a of the electric wires 50.

With the above configuration of the lead portions 53b, it is possible to reliably prevent the twelfth in-slot portions 51L of the electric wires 50, which are located most radially inward in the slots 31 of the stator core 30, from protruding radially inward due to the springback of the electric wires 50. Consequently, it is possible to reliably prevent the stator coil 40 from interfering with the rotor of the electric rotating machine which is located radially inside of the stator 20.

In the present embodiment, each of the lead portions 53b of the electric wires 50 is configured to include the crossover part 70 that crosses over the annular axial end face of the stator coil 40 from the radially inside to the radially outside of the axial end face.

With the crossover parts 70 of the lead portions 53b, it is possible to more reliably prevent the twelfth in-slot portions 51L of the electric wires 50 from protruding radially inward.

In the present embodiment, each of the crossover parts 70 of the lead portions 53b of the electric wires 50 is crank-shaped to include the pair of radially-extending end sections 70a and 70b.

With the above shape, it is possible to facilitate the bending of the lead portions 53b of the electric wires 50 for forming the crossover parts 70 and the welding of the corresponding pairs of the lead portions 53a and 53b of the electric wires 50. In addition, it is also possible for the lead portions 53a to exert a restraining force in a radially outward direction to the twelfth in-slot portions 51L via the lead portions 53b, thereby more reliably preventing the twelfth in-slot portions 51L from protruding radially inward.

In the present embodiment, the crossover parts 70 of the lead portions 53b of the electric wires 50 are located on the same axial side of the stator core 30 as the U-phase, V-phase, and W-phase output terminals and the U-phase, V-phase, and W-phase neutral terminals. Further, on the annular axial end face of the stator coil 40, the crossover parts 70 are arranged in a different angular range of the axial end face from the U-phase, V-phase, and W-phase neutral terminals. In other words, the U-phase, V-phase, and W-phase neutral terminals are arranged in the same angular range.

With the above arrangement, it is possible to draw the U-phase, V-phase, and W-phase neutral terminals together with each other, thereby facilitating the electrical connecting of the stator coil 40.

Further, in the present embodiment, on the annular axial end face of the stator coil 40, the U-phase, V-phase, and W-phase output terminals are arranged in the same angular range of the axial end face as the U-phase, V-phase, and W-phase neutral terminals.

With the above arrangement, it is possible to draw all of the U-phase, V-phase, and W-phase output terminals and the U-phase, V-phase, and W-phase neutral terminals together with each other, thereby further facilitating the electrical connecting of the stator coil 40.

In the present embodiment, for each of the electric wires 50, the lead portions 53a and 53b are respectively offset inward in the longitudinal direction Y of the electric wire 50 from the first and twelfth in-slot portions 51A and 51L by the lengths of the half-turn portions 52M and 52N.

With the above configuration, the distances between the corresponding pairs of the lead portions 53a and 53b of the electric wires 50 can be reduced, thereby lowering the resistance of the stator coil 40 and thus the copper loss of the stator 20.

In the present embodiment, the corresponding pairs of the lead portions 53a and 53b of the electric wires 50 are connected by welding. Consequently, the corresponding pairs of the lead portions 53a and 53b can be securely joined together, thereby ensuring the durability of the stator 20.

Further, in the present embodiment, the corresponding pairs of the lead portions 53a and 53b of the electric wires 50 are welded radially outside of the radially outermost turn portions 52 of the electric wires 50. Consequently, the insulating coats 68 of the turn portions 52 of the electric wires 50 are prevented from being damaged by the heat generated during the welding.

In the present embodiment, each of the turn portions 52 of the electric wires 50 is stepped to include the plurality of shoulder parts 55 and 56 that extend parallel to the corresponding axial end face 30a of the stator core 30 from which the turn portion 52 protrudes.

With the shoulder parts 55 and 56, the protruding height of each of the turn portions 52 from the corresponding axial end face 30a of the stator core 30 can be reduced. As a result, the axial length of the coil end parts 42 of the stator coil 40 can be reduced.

In the present embodiment, each of the electric wires 50 forming the stator coil 40 is comprised of the electric conductor 67 having a substantially rectangular cross section and the insulating coat 68 covering the surface of the electric conductor 67.

With the substantially rectangular cross section, it is possible to densely arrange the in-slot portions 51 of the electric wires 50 in the slots 31 of the stator core 30 without radial gaps formed therebetween, thereby securing high space factors of the electric wires 50 in the slots 31. Moreover, it is also possible to densely arrange the turn portions 52 of the electric wires 50 without radial gaps formed therebetween, thereby minimizing the radial size of the coil end parts 42 of the stator coil 40.

In the present embodiment, all of the electric wires 50 have the same shape at least between the lead portions 53a and 53b.

With the above configuration, it is possible to shape all of the electric wires 50 using the same shaping machine and simplify the process of shaping the electric wires 50, thereby reducing the manufacturing cost of the stator coil 40.

In the present embodiment, the stator coil 40 is so configured that when viewed along the axis O of the stator core 30, each of the electric wires 50 forming the stator coil 40 spirally extends around the axis O of the stator core 30.

With the above configuration, it is possible to densely arrange the electric wires 50 without increasing the radial dimension of the stator core 40.

Figure 19A:
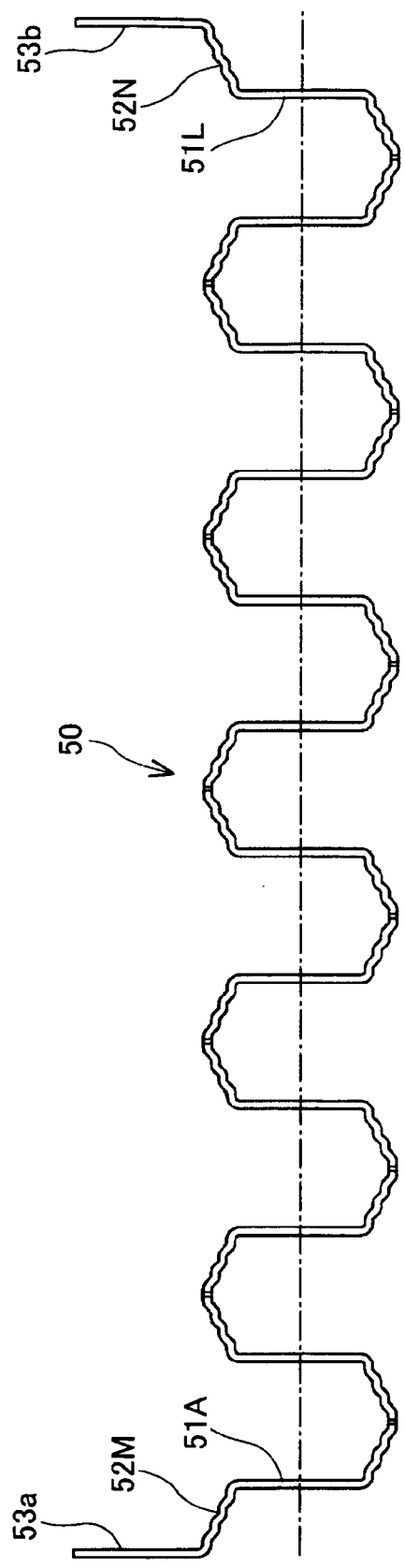
FIG. 19A is a front view of an electric wire for forming the stator coil according to a first modification of the invention.

FIG. 19A illustrates the electric wires 50 according to a first modification of the invention. In this modification, the half-turn portions 52M and 52N are formed to extend outward in the longitudinal direction of the electric wire 50 respectively from the first and twelfth in-slot portions 51A and 51L. Consequently, the lead portions 53a and 53b are respectively offset outward in the longitudinal direction from the first and twelfth in-slot portions 51A and 51L by the lengths of the half-turn portions 52M and 52N.

Figure 19B:
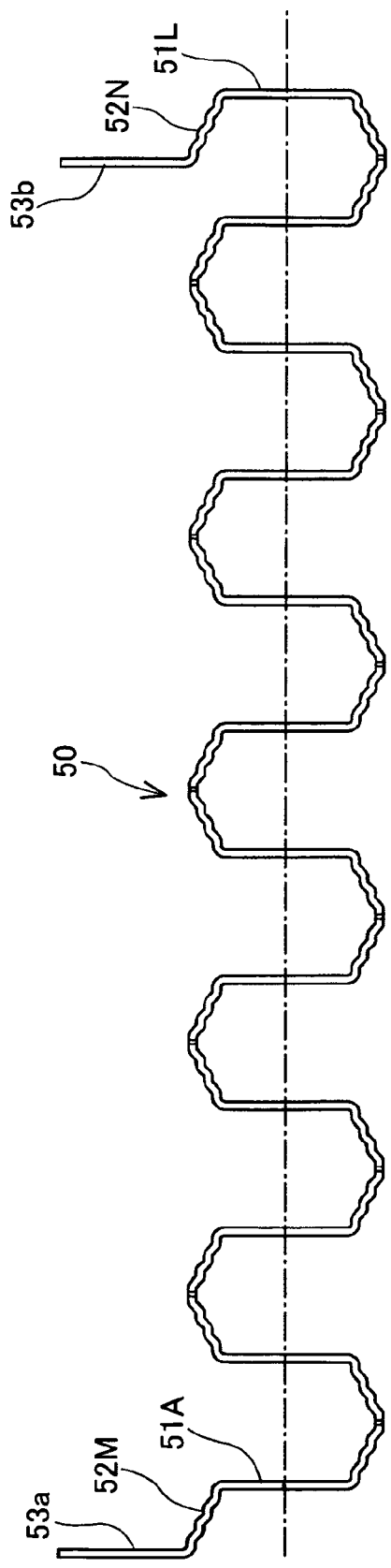
FIG. 19B is a front view of an electric wire for forming the stator coil according to a second modification of the invention.

FIG. 19B illustrates the electric wires 50 according to a second modification of the invention. In this modification, the half-turn portion 52M is formed to extend outward in the longitudinal direction of the electric wire 50 from the first in-slot portion 51A, whereas the half-turn portion 52N is formed to extend inward in the longitudinal direction from the twelfth in-slot portion 51L, Consequently, the lead portion 53a is offset outward in the longitudinal direction from the first in-slot portion 51A by the length of the half-turn portion 52M, whereas the lead portion 53b is offset inward in the longitudinal direction from the twelfth in-slot portion 51L by the length of the half-turn portion 52N.

FIG. 20A illustrates the electric wires 50 according to a third modification of the invention. In this modification, the half-turn portion 52M is formed to extend inward in the longitudinal direction of the electric wire 50 from the first in-slot portion 51A, whereas the half-turn portion 52N is formed to extend outward in the longitudinal direction from the twelfth in-slot portion 51L. Consequently, the lead portion 53a is offset inward in the longitudinal direction from the first in-slot portion 51A by the length of the half-turn portion 52M, whereas the lead portion 53b is offset outward in the longitudinal direction from the twelfth in-slot portion 51L by the length of the half-turn portion 52N.

FIG. 20B illustrates the electric wires 50 according to a fourth modification of the invention. In this modification, both the half-turn portions 52M and 52N are omitted so that the lead portions 53a and 53b extend respectively from the first and twelfth in-slot portions 51A and 51L without being offset therefrom in the longitudinal direction of the electric wire 50.

Figure 21:
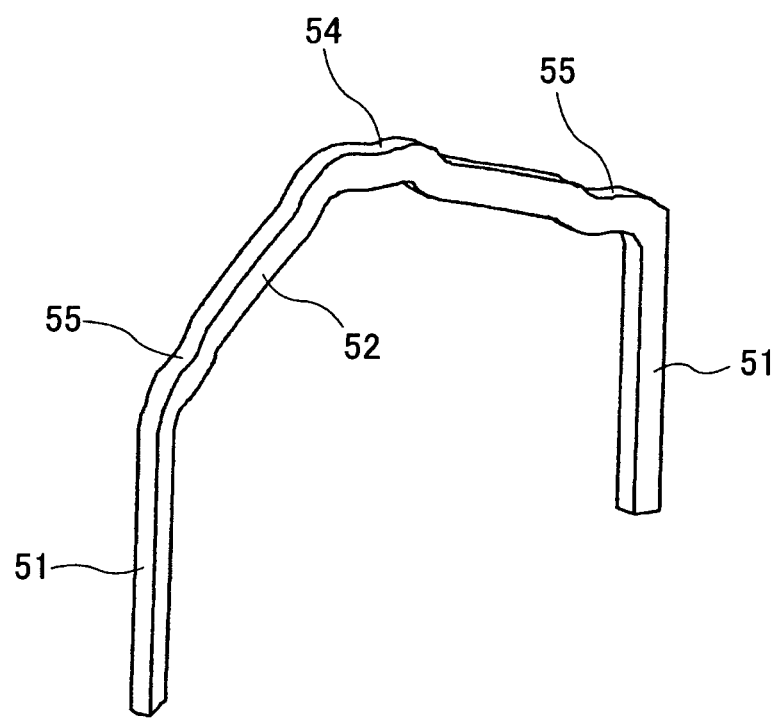
FIG. 21 is a perspective view illustrating a turn portion of an electric wire for forming the stator coil according to a fifth modification of the invention.

FIG. 21 illustrates the electric wires 50 according to a fifth modification of the invention. In this modification, the shoulder parts 56 as shown in FIG. 12A are omitted from each of the turn portions 52 of the electric wires 50. Consequently, those parts between the crank-shaped part 54 and the shoulder parts 55 in each of the turn portions 52 of the electric wires 50 become straight. As a result, the shape of the turn portions 52 of the electric wires 50 is simplified, thereby facilitating the shaping of the electric wires 50.

FIGS. 22A-22B illustrate the electric wires 50 according to a sixth modification of the invention. In this modification, both the half-turn portions 52M and 52N are shaped straight without being stepped as shown in FIGS. 11A-11B. With the straight shape of the half-turn portions 52M and 52N, the lead portions 53a and 53b can be more easily and accurately positioned. In addition, it is also possible to shape only one of the half-turn portions 52M and 52N straight.

[Second Embodiment]

Figure 23:
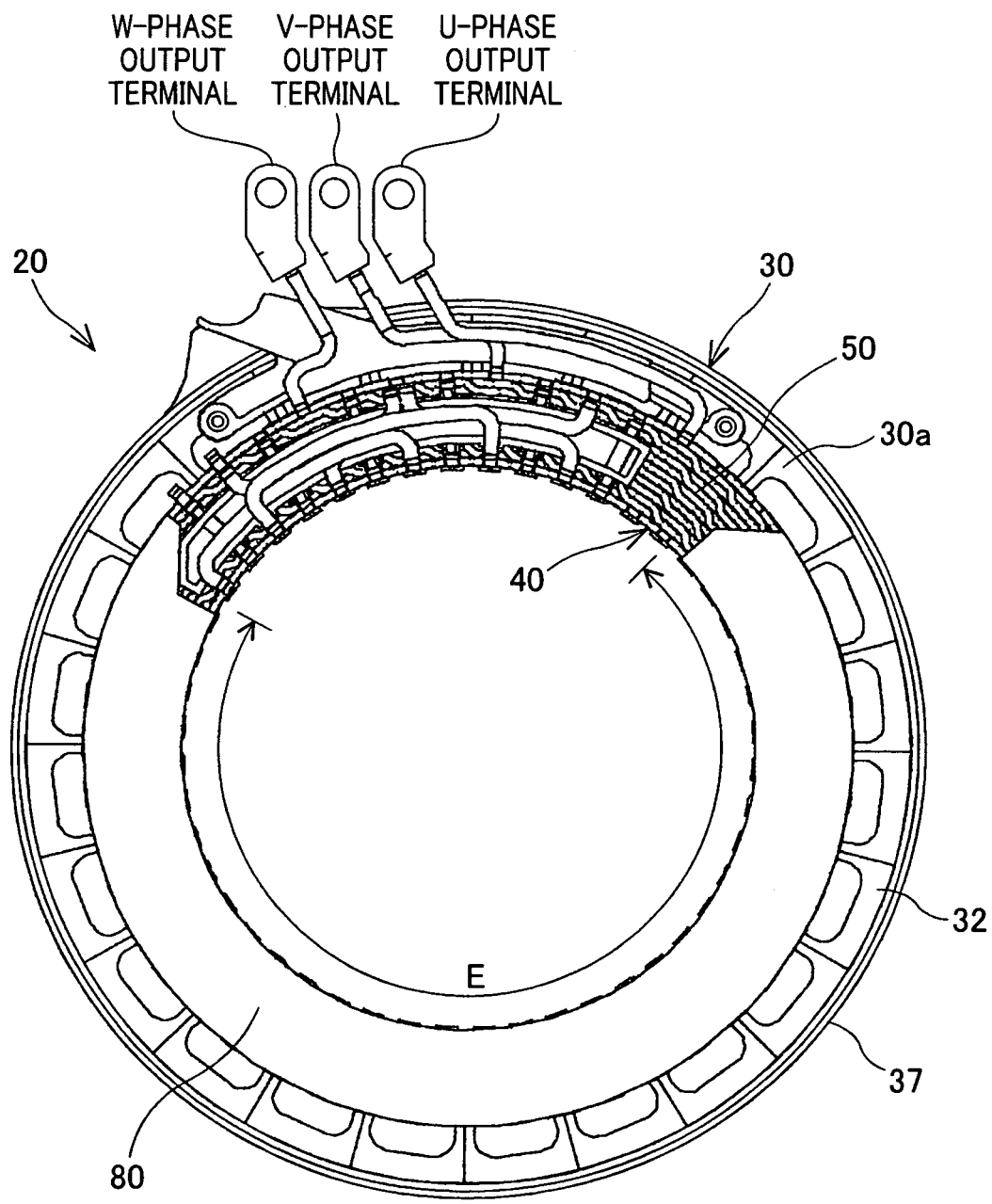
FIG. 23 is a top view of a stator according to the second embodiment of the invention.
Figure 24:
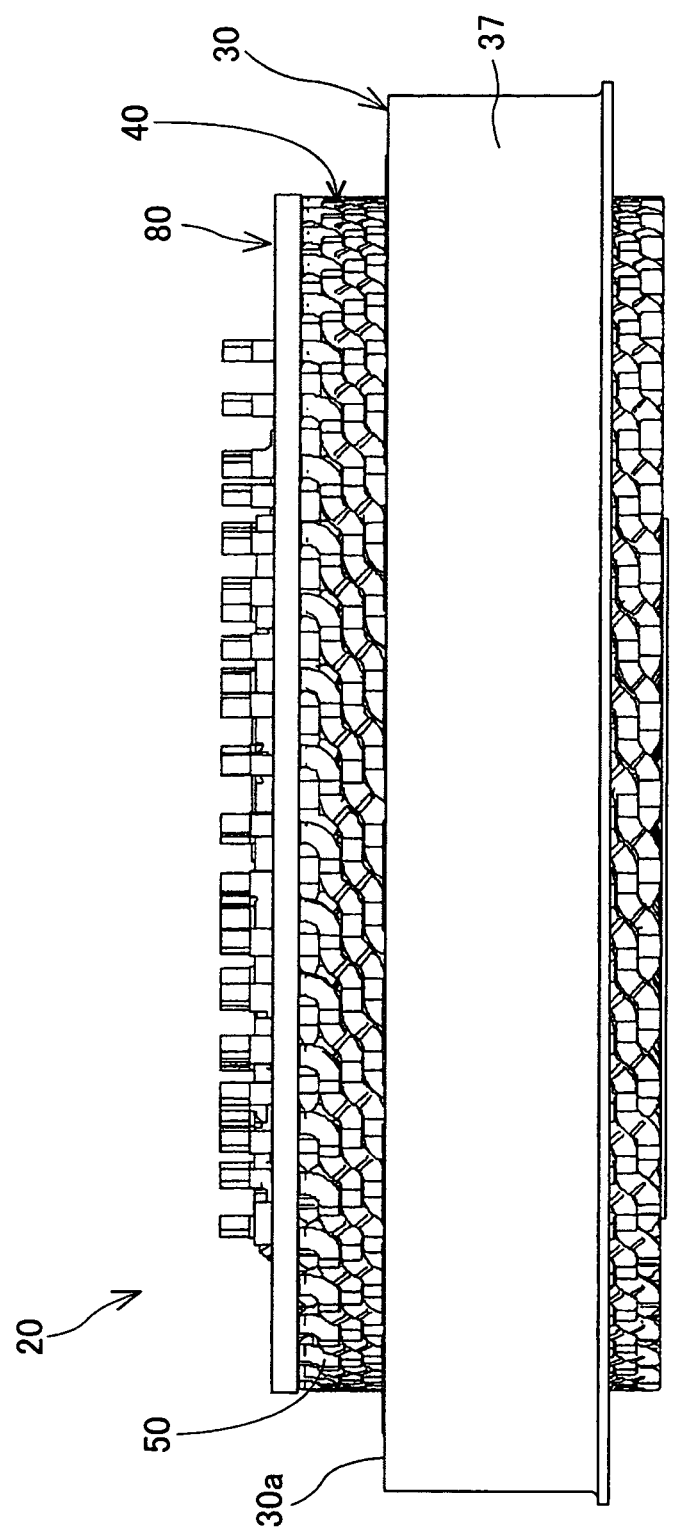
FIG. 24 is a side view of the stator according to the second embodiment.

FIGS. 23-24 illustrate a stator 20 according to a second embodiment of the invention. This stator 20 has almost the same configuration as the stator 20 according to the first embodiment; accordingly, only the differences therebetween will be described hereinafter.

As described previously, in the first embodiment, the corresponding pairs of the lead portions 53a (i.e., first end portions) and lead portions 53b (i.e., second end portions) of the electric wires 50 are connected via the crossover parts 70 provided in the lead portions 53b.

In comparison, in the present embodiment, the crossover parts 70 are omitted from the lead portions 53b of the electric wires 50. Instead, the stator 20 is provided with a connector 80 to connect the corresponding pairs of the lead portions 53a and 53b of the electric wires 50.

Figure 25:
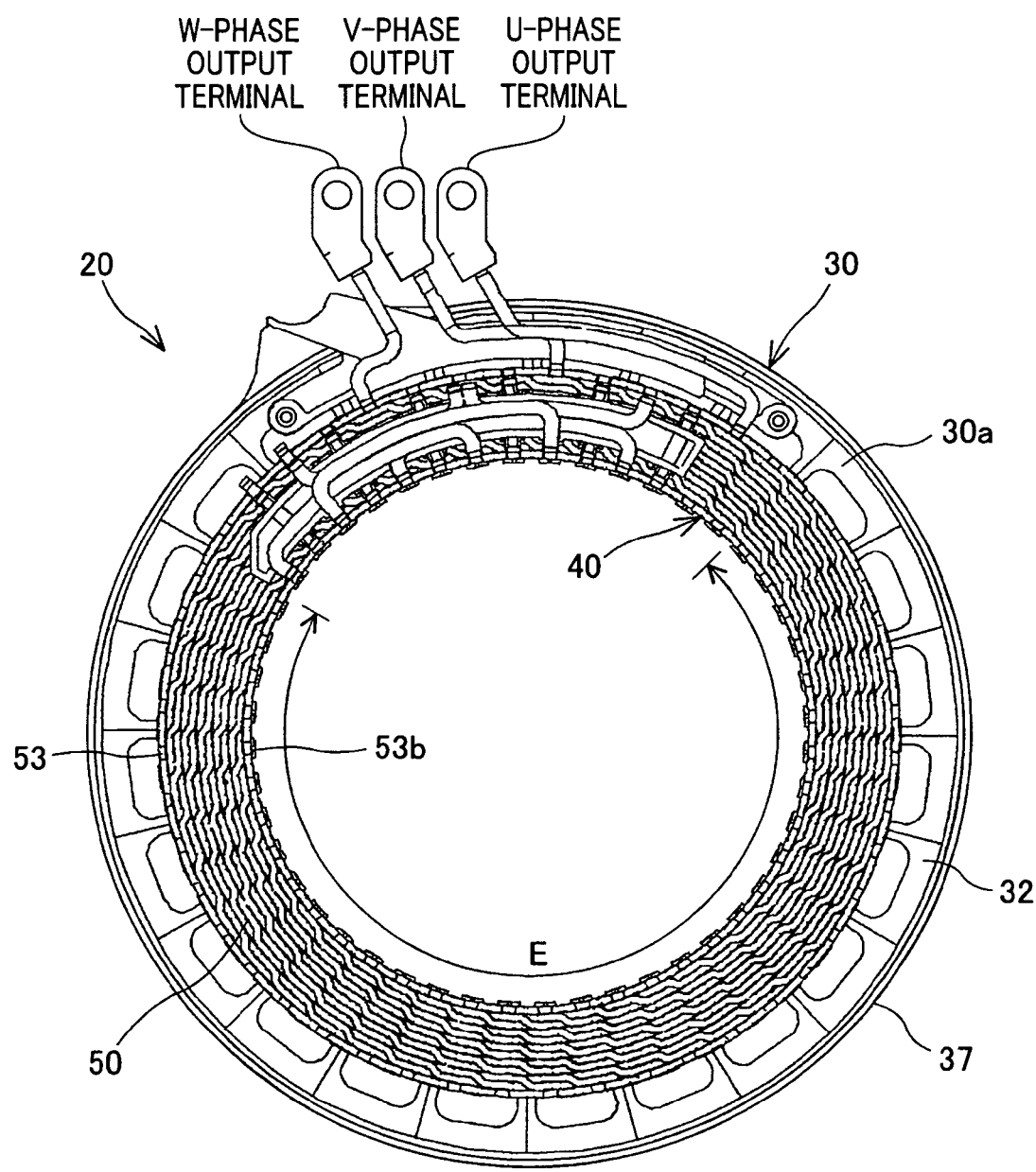
FIG. 25 is a top view of the stator according to the second embodiment omitting a connector thereof.
Figure 26:
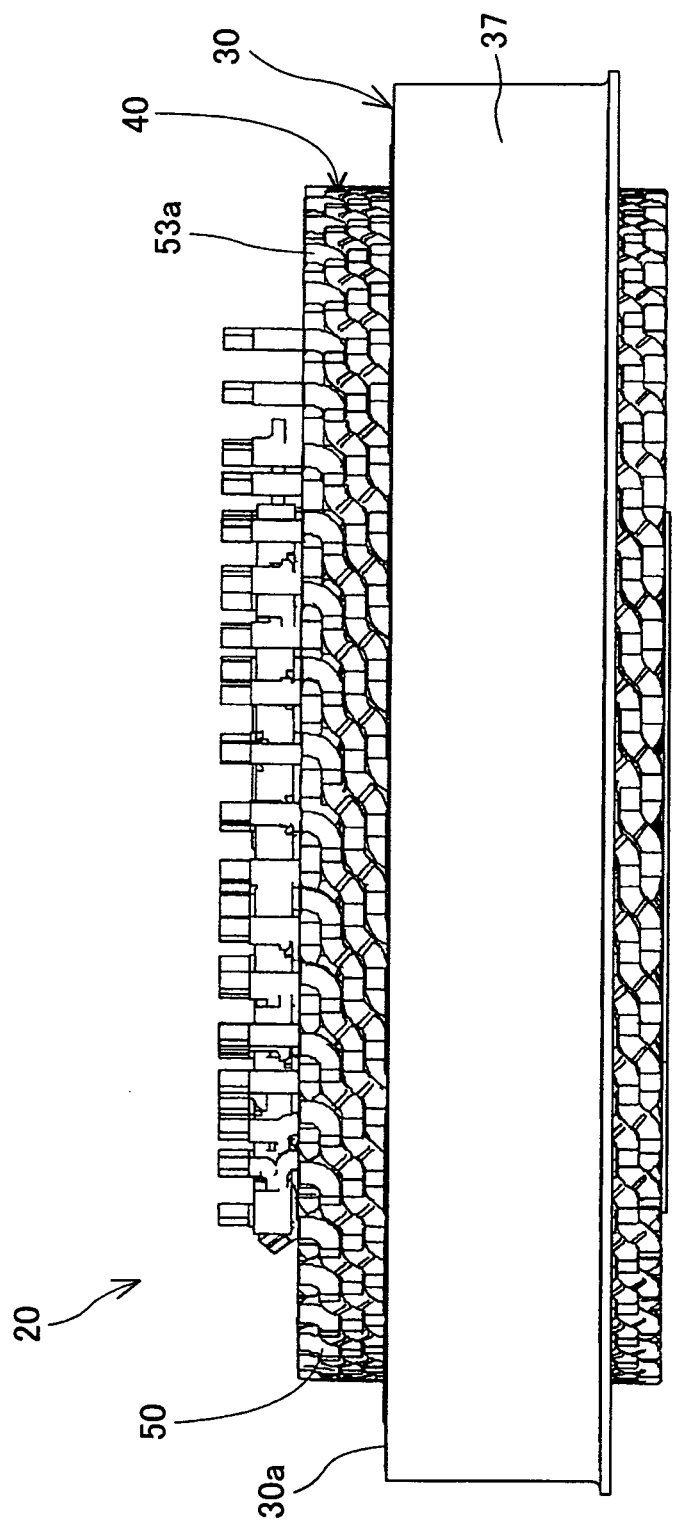
FIG. 26 is a side view of the stator according to the second embodiment omitting a connector thereof.

Specifically, as shown in FIG. 25, before mounting the connector 80 to the stator coil 40, the lead portions 53a and 53b of the electric wires 50 remain unconnected in an angular range E of the annular axial end face of the stator coil 40; the angular range E is substantially ¾ of the full angular range of the axial end face. Moreover, referring to FIG. 26, all of the lead portions 53a and 53b of the electric wires 50 have substantially the same protruding height from the axial end face 30a of the stator core 30 as the turn portions 52 of the electric wires 50.

Figure 27:
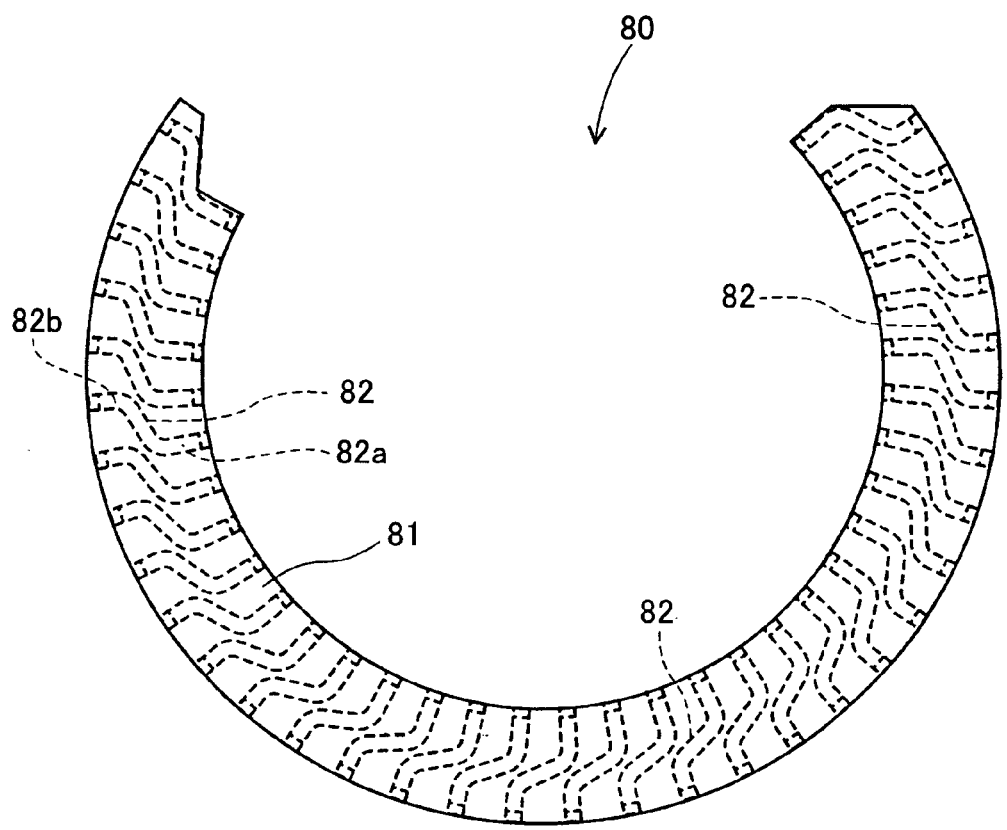
FIG. 27 is a top view of the connector.
Figure 28:
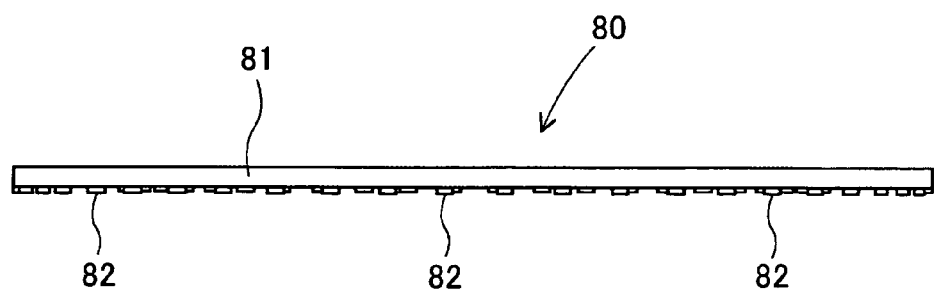
FIG. 28 is a side view of the connector.
Figure 29:
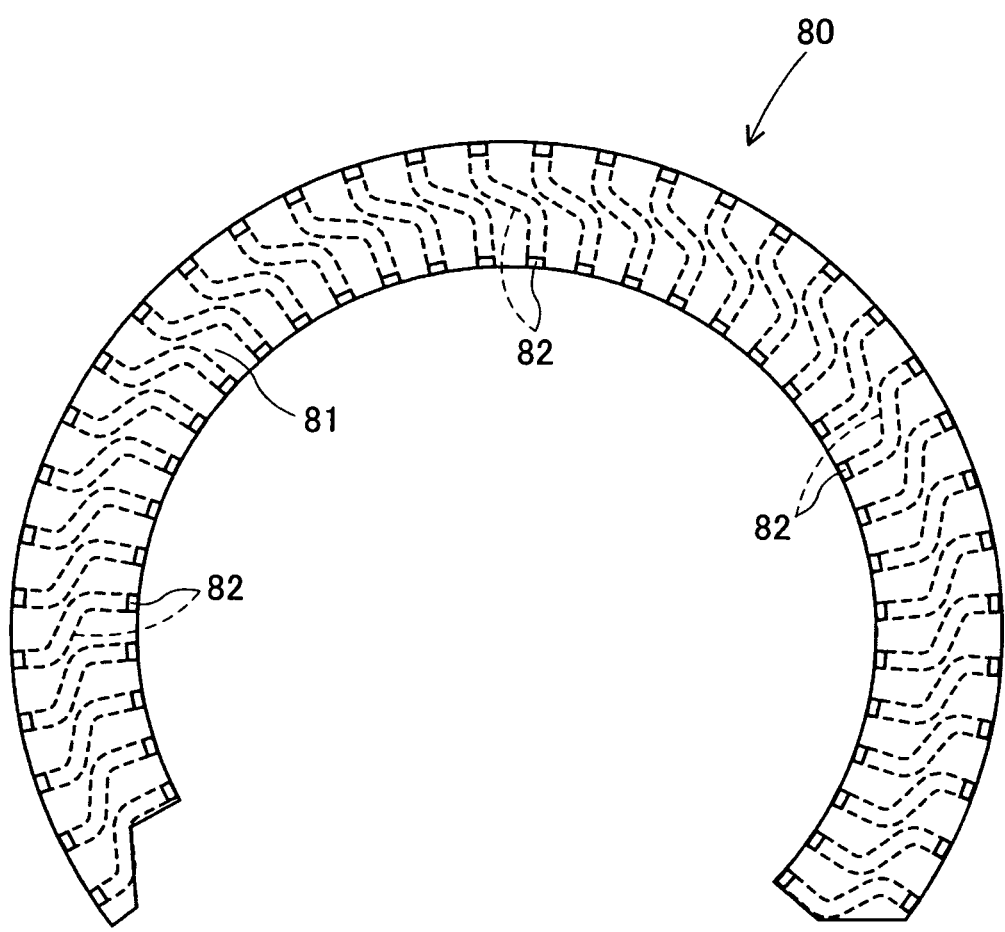
FIG. 29 is a bottom view of the connector.

As shown in FIGS. 27-29, the connector 80 is comprised of a substrate 81 and a plurality of (e.g., 34 in the present embodiment) electric conductors 34 embedded in the substrate 81. The substrate 81 is made of an electrically-insulative material, such as an electrically-insulative resin. The substrate 81 has the shape of a partial ring so as to cover the angular range E of the annular axial end face of the stator coil 40. The conductors 82 are formed to have the same crank-like shape as the crossover parts 70 according to the first embodiment. The conductors 82 are equally spaced in the circumferential direction of the substrate 81 (or the circumferential direction of the stator core 30) at a predetermined pitch. Further, each of the conductors 82 has a pair of radially-extending end sections 82a and 82b. The end sections 82a and 82b are bent respectively at the radially inner and outer peripheries of the substrate 81 to protrude from a major surface of the substrate 81 which faces the lead portions 53a and 53b of the stator coil 40.

The connector 80 is mounted to the stator coil 40 so that the end sections 82a of the conductors 82 are respectively brought into contact with the lead portions 53b of the electric wires 50 and the end sections 82b are respectively brought into contact with the lead portions 53a. Then, the end sections 82a of the conductors 82 are respectively welded to the lead portions 53b of the electric wires 50 at the radially inner periphery of the stator coil 40; the end sections 82b are respectively welded to the lead portions 53a at the radially outer periphery of the stator coil 40. As a result, the corresponding pairs of the lead portions 53a and 53b of the electric wires 50 are electrically connected via the conductors 82 of the connector 80.

As described above, in the present embodiment, the electrical connection between the corresponding pairs of the lead portions 53a and 53b of the electric wires 50 is made by means of the connector 80. The conductors 82 of the connector 80 perform the same function as the crossover parts 70 of the lead portions 53b according to the first embodiment.

With the use of the connector 80, it is possible to easily and accurately position the conductors 82 with respect to the lead portions 53a and 53b of the electric wires 50, thereby improving the assembly efficiency of the stator 20.

While the above particular embodiments and modifications of the invention have been shown and described, it will be understood by those skilled in the art that further modifications, changes, and improvements may be made without departing from the spirit of the invention.

For example, in the first embodiment, the lead portions 53b of the electric wires 50 are bent radially outward so as to be connected to the corresponding lead portions 53a on the radially outside of the stator coil 40. However, instead of bending the lead portions 53b, it is also possible to bend the lead portions 53a radially inward so as to be connected to the corresponding lead portions 53b on the radially inside of the stator coil 40.

Figure 30:
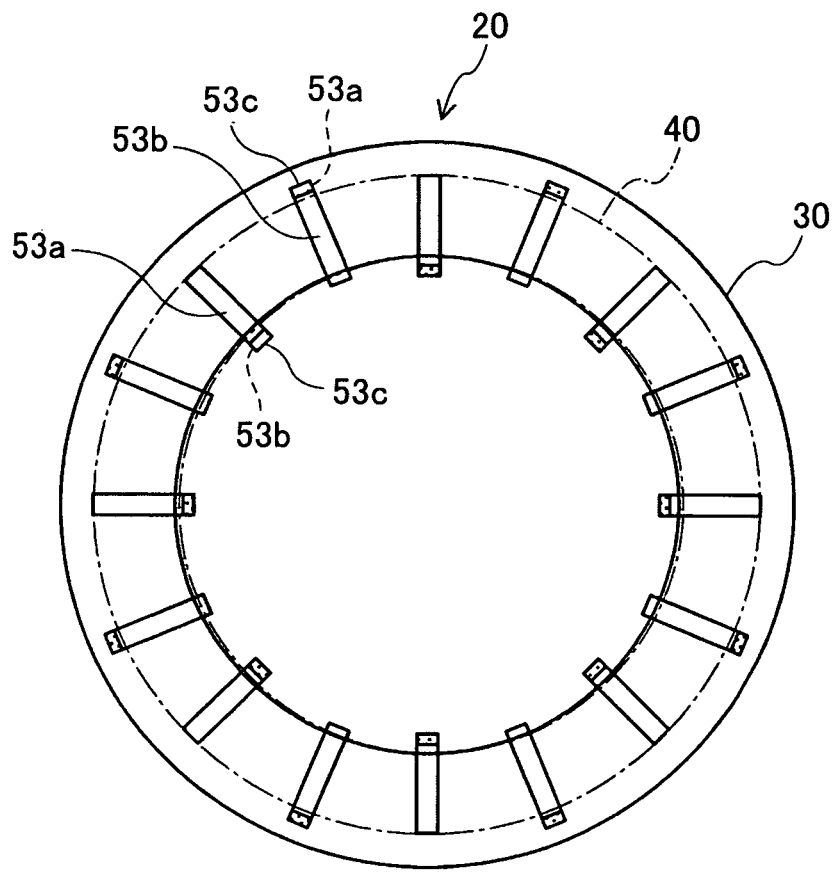
FIG. 30 is a schematic view illustrating the manner of connecting electric wires according to the seventh modification of the invention.

FIG. 30 illustrates the lead portions 53a and 53b of the electric wires 50 according to a seventh modification of the invention. In this modification, the lead portions 53a and 53b are bent radially inward or radially outward alternately in the circumferential direction of the stator core 30; the welds 53c between the corresponding pairs of the lead portions 53a and 53b are formed on the radially inside or radially outside of the stator coil 40 alternately in the circumferential direction of the stator core 30.

Figure 31:
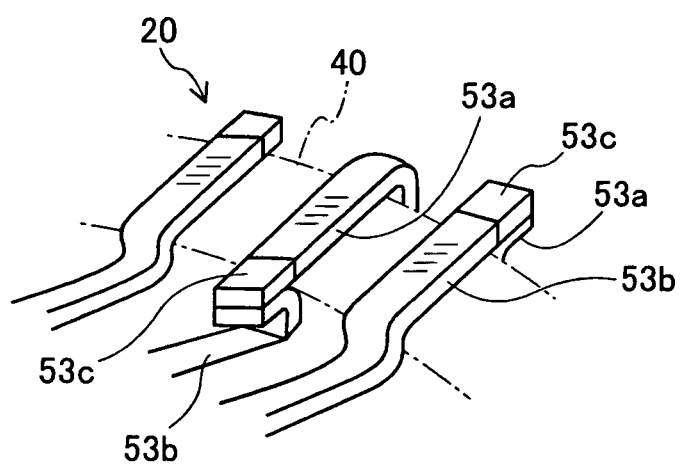
FIG. 31 is a schematic view illustrating the manner of connecting electric wires according to the eighth modification of the invention.

FIG. 31 illustrates the lead portions 53a and 53b of the electric wires 50 according to an eighth modification of the invention. In this modification, the lead portions 53a and 53b are bent so as to form the welds 53c between the corresponding pairs of the lead portions 53a and 53b on the radially outside or at the radially middle position of the stator coil 40 alternately in the circumferential direction of the stator core 30.

With the above configurations of the lead portions 53a and 53b according to the seventh and eighth modifications, it is possible to increase the distance between each adjacent pair of the welds 53c, thereby improving electrical insulation therebetween.

Further, in the first embodiment, the crossover parts 70 are configured to extend almost along the annular axial end face of the stator coil 40 from the radially inside to the radially outside of the axial end face. However, the crossover parts 70 may also be configured to extend from the radially inside to the radially outside of the axial end face keeping a predetermined distance from the axial end face of the stator coil 40.

In the present embodiment, the crossover parts 70 are formed to have the crank-like shape. However, the crossover parts 70 may also be formed to have other shapes, such as a straight shape.

In the first embodiment, on the annular axial end face of the stator coil 40, the crossover parts 70 are arranged in a different angular range from the U-phase, V-phase, and W-phase output terminals and the U-phase, V-phase, and W-phase neutral terminals. However, the crossover parts 70 may also be arranged in the same angular range as the U-phase, V-phase, and W-phase output terminals and the U-phase, V-phase, and W-phase neutral terminals.

In the first embodiment, the corresponding pairs of the lead portions 53a and 53b of the electric wires 50 are connected by welding. As to the welding method, any suitable welding method, such as laser welding, may be used.

Furthermore, the corresponding pairs of the lead portions 53a and 53b of the electric wires 50 may also be connected by other methods, for example, soldering or using crimp contacts.

In the first embodiment, after welding the corresponding pairs of the lead portions 53a and 53b of the electric wires 50, it is preferable to take an additional measure to protect the welds formed between the lead protons 53a and 53b, for example by covering the welds with respective insulating coats or with a one-piece insulating cover.

In the first embodiment, each of the turn portions 52 of the electric wires 50 includes the crank-shaped part 54 that is formed substantially at the center of the turn portion 52 for radially offsetting a corresponding pair of the in-slot portions 51 connected by the turn portion 52. However, the crank-shaped part 54 is not necessarily formed substantially at the center of the turn portion 52. For example, the crank-shaped part 54 may be formed in the vicinity of one end of the turn portion 52.

In the first embodiment, the amount of radial offset made by each of the crank-shaped parts 54 of the turn portions 52 is set to be equal to the radial thickness of the in-slot portions 51 of the electric wires 50. However, the amount of radial offset made by each of the crank-shaped parts 54 may also be set to be, for example, 0.5, 1.5, or 2 times the radial thickness of the in-slot portions 51. In such cases, the difference in radial distance from the axis O of the stator core 30 between each adjacent pair of the in-slot portions 51, which are connected by a corresponding one of the turn portions 52, would be accordingly 0.5, 1.5, or 2 times the radial thickness of the in-slot portions 51.

In the first embodiment, n=12, where n is the number of in-slot portions 51 provided in each of the electric wires 50. However, n may also be equal to other integers not less than 4. In addition, it is preferable that n is an even number so as to locate the lead portions 53a and 53b of each of the electric wires 50 on the same axial side of the stator core 30.

In the first embodiment, for each of the electric wires 50, the radial distances of the first to the twelfth in-slot portions 51A-51L from the axis O of the stator core 30 successively decrease in equal decrements (i.e., in the decrements equal to the radial thickness of the in-slot portions 51A-51L). However, each of the electric wires 50 may also be modified so that the radial distances of the first to the twelfth in-slot portions 51A-51L from the axis O of the stator core 30 successively decrease in different decrements.

In the first embodiment, the number of the in-slot portions 51 of the electric wires 50 radially stacked in each of the slots 31 of the stator core 30 is set to be equal to the number of the in-slot portions 51 provided in each of the electric wires 50. However, the number of the in-slot portions 51 of the electric wires 50 radially stacked in each of the slots 31 of the stator core 30 may also be set to be different from the number of the in-slot portions 51 provided in each of the electric wires 50.

In the first embodiment, the number of the electric wires 50 forming the stator coil 40 is equal to the number of the slots 31 formed in the stator core 30. However, the number of the electric wires 50 forming the stator coil 40 may also be different from the number of the slots 31 formed in the stator core 30.

In the first embodiment, the stator coil 40 is formed as a three-phase stator coil which is comprised of the U-phase, V-phase, and W-phase windings 43. However, the stator coil 40 may also be formed as any multi-phase coil, for example 2-phase stator coil.

Furthermore, each of the U-phase, V-phase, and W-phase windings 43 is formed by connecting 16 electric wires 50. However, each of the U-phase, V-phase, and W-phase windings 43 may also be formed by connecting any other plural number of electric wires, for example two electric wires.

What is claimed is:

1. A stator for an electric rotating machine, the stator comprising:
   a hollow cylindrical stator core having a plurality of slots that are formed in a radially inner surface of the stator core and spaced in a circumferential direction of the stator core; and
   a stator coil comprised of a plurality of electric wires mounted on the stator core,
   wherein
   each of the electric wires has first, second, . . . , nth in-slot portions and first, second, . . . , (n+1)th turn portions, where n is an integer not less than 4,
   the first to the nth in-slot portions are sequentially received in p of the slots of the stator core, where p is an integer not greater than n,
   the first to the (n+1)th turn portions are alternately located on opposite axial sides of the stator core outside of the slots to connect corresponding adjacent pairs of the first to the nth in-slot portions,
   each of the electric wires also has first and second end portions, the first end portion being closer to the first in-slot portion than any other of the in-slot portions of the electric wire, the second end portion being closer to the nth in-slot portion than any other of the in-slot portions of the electric wire,
   the first in-slot portions of the electric wires are located most radially outward and the nth in-slot portions are located most radially inward in the slots of the stator core,
   the stator coil is a multi-phase stator coil which is comprised of a plurality of phase windings,
   each of the phase windings of the stator coil is formed of at least two of the electric wires,
   the first end portion of one of the two electric wires is connected to the second end portion of the other electric wire, and
   the number of electric wires forming the stator coil is equal to the number of slots formed in the stator core.

2. The stator as set forth in claim 1, wherein the stator coil is an electric wire assembly that has a hollow cylindrical shape that is formed by rolling a band shaped electric wire assembly, and
   the band-shaped electric wire assembly is formed by stacking the plurality of electric wires.

3. The stator as set forth in claim 1, wherein the second end portion of the other electric wire is bent outward in a radial direction of the stator core.

4. The stator as set forth in claim 1, wherein the first end portion of the electric wire is connected to the second end portion of the other electric wire via an electrically-conductive crossover member that extends to cross over an annular axial end face of the stator coil from the radially inside to the radially outside of the axial end face.

5. The stator as set forth in claim 4, wherein the crossover member is crank-shaped to include a pair of radially-extending end sections.

6. The stator as set forth in claim 4, wherein each of the phase windings of the stator coil has a neutral terminal connected to a neutral point of the stator coil, and on the annular axial end face of the stator coil, the crossover members for the phase windings of the stator coil are arranged in a different angular range of the axial end face from the neutral terminals of the phase windings.

7. The stator as set forth in claim 6, wherein each of the phase windings of the stator coil further has an output terminal, and on the annular axial end face of the stator coil, the output terminals of the phase windings of the stator coil are arranged in the same angular range of the axial end face as the neutral terminals of the phase windings.

8. The stator as set forth in claim 4, wherein the second end portion of the other electric wire is formed to include the crossover member as an integral part thereof.

9. The stator as set forth in claim 1, wherein the stator further comprises a connector that includes a plurality of electric conductors, and the first end portion of the electric wire is connected to the second end portion of the other electric wire via a corresponding one of the conductors of the connector.

10. The stator as set forth in claim 9, wherein the connector further includes a substrate made of an electrically-insulative material, and the conductors are embedded in the substrate.

11. The stator as set forth in claim 1, wherein for each of the electric wires forming the stator coil, at least one of the first and second end portions of the electric wire is offset inward in a longitudinal direction of the electric wire from the closer one of the first and nth in-slot portions of the electric wire.

12. The stator as set forth in claim 1, wherein for each of the phase windings of the stator coil, the first end portion of the electric wire is welded to the second end portion of the other electric wire.

13. The stator as set forth in claim 12, wherein the first end portion of the electric wire and the second end portion of the other electric wire are welded radially outside of the radially outermost turn portions of the electric wires.

14. The stator as set forth in claim 1, wherein each of the turn portions of the electric wires is stepped to include a plurality of shoulder parts that extend parallel to an axial end face of the stator core from which the turn portion protrudes.

15. The stator as set forth in claim 1, wherein each of the electric wires forming the stator coil further has a first half-turn portion formed between the first end and the first in-slot portion and a second half-turn portion formed between the second end and the nth in-slot portion of the electric wire, and for each of the electric wires, at least one of the first and second half-turn portions of the electric wire is shaped straight.

16. The stator as set forth in claim 1, wherein each of the electric wires forming the stator coil is comprised of an electric conductor having a substantially rectangular cross section and an insulating coat covering the surface of the electric conductor.

17. The stator as set forth in claim 1, wherein all of the electric wires forming the stator coil have the same shape at least between the first and second end portions.

18. The stator as set forth in claim 1, wherein when viewed along a longitudinal axis of the stator core, each of the electric wires spirally extends around the longitudinal axis.

\* \* \* \* \*